US010748385B2

(12) United States Patent
Hopkins et al.

(10) Patent No.: US 10,748,385 B2
(45) Date of Patent: Aug. 18, 2020

(54) METHOD AND APPARATUS FOR STORING A PLURALITY OF WAGER DATA FROM A PLURALITY OF INDIVIDUAL WAGERS IN A PARIMUTUEL WAGERING SYSTEM

(71) Applicant: Inspired Gaming (UK) Limited, London (GB)

(72) Inventors: Alistair Hopkins, Gwynedd (GB); Tariq Tufail, Llanfairpwllgwyngyll (GB)

(73) Assignee: Inspired Gaming (UK) Limited, London (GB)

(*) Notice: Subject to any disclaimer, the term of this patent is extended or adjusted under 35 U.S.C. 154(b) by 50 days.

(21) Appl. No.: 15/941,700

(22) Filed: Mar. 30, 2018

(65) Prior Publication Data
US 2019/0304258 A1    Oct. 3, 2019

(51) Int. Cl.
*G06F 17/00*    (2019.01)
*G07F 17/32*    (2006.01)
*G06F 16/182*   (2019.01)

(52) U.S. Cl.
CPC ...... *G07F 17/3288* (2013.01); *G07F 17/3227* (2013.01); *G07F 17/3255* (2013.01); *G06F 16/182* (2019.01)

(58) Field of Classification Search
CPC .............. G06F 16/182; G07F 17/3202; G07F 17/3227; G07F 17/3258; G07F 17/3288; G07F 17/329
See application file for complete search history.

(56) References Cited

U.S. PATENT DOCUMENTS 7,788,482 B2    8/2010    Irwin, Jr.
8,037,307 B2   10/2011    Irwin, Jr.
(Continued)

FOREIGN PATENT DOCUMENTS

WO    9523383 A1    8/1995
WO   2014066986 A1    5/2014

OTHER PUBLICATIONS

Wikipedia, "In-memory database", Jan. 9, 2018, <https://en.wikipedia.org/w/index.php?title=In-memory_database&oldid=819467252> (Year: 2018).*

(Continued)

*Primary Examiner* — Justin L Myhr
(74) *Attorney, Agent, or Firm* — Panitch Schwarze Belisario & Nadel LLP

(57) ABSTRACT

A plurality of wager data is stored from a plurality of individual wagers in a true parimutuel or "Class II" Bingo draw game in a plurality of structures using n number of non-volatile data storage devices, and a volatile data storage device. The wager data for each individual wager includes wager selection, wager amount, draw game identifier, and a unique wager identifier. A mathematical operation is performed on at least a portion of wager data for each of the individual wagers which causes the plurality of wager data to be distributed among n sets. The wager data for each of the individual wagers is stored in the nth non-volatile data storage device as distributed among the n sets. After the wager data is stored in the n non-volatile data storage devices, at least a portion of the wager data for each of the individual wagers is stored in the volatile data storage device. The stored portion of the wager data includes at least the wager selection, and the unique wager identifier.

24 Claims, 17 Drawing Sheets

(56) References Cited

U.S. PATENT DOCUMENTS

| | | |
|---|---|---|
| 8,747,209 B2 | 6/2014 | Badrieh |
| 9,659,446 B2* | 5/2017 | Janosov .............. G07F 17/3244 |
| 2002/0058548 A1* | 5/2002 | Stronach ................ G06Q 50/34 |
| | | 463/25 |
| 2003/0050109 A1 | 3/2003 | Caro et al. |
| 2003/0073497 A1* | 4/2003 | Nelson ................... A63F 13/12 |
| | | 463/42 |
| 2003/0157976 A1* | 8/2003 | Simon .................... G06Q 50/34 |
| | | 463/1 |
| 2004/0058726 A1 | 3/2004 | Klugman |
| 2005/0239546 A1* | 10/2005 | Hedrick .............. G07F 17/0014 |
| | | 463/29 |
| 2007/0072667 A1* | 3/2007 | Limacher ................ G07F 17/32 |
| | | 463/16 |
| 2009/0131132 A1 | 5/2009 | Kohls et al. |
| 2009/0227320 A1 | 9/2009 | McBride |
| 2010/0222136 A1 | 9/2010 | Goto et al. |
| 2011/0245943 A1* | 10/2011 | Agarwal ................ G06Q 30/00 |
| | | 700/91 |
| 2011/0281629 A1 | 11/2011 | Meyer |
| 2011/0289351 A1* | 11/2011 | Rashmi .............. G06F 11/1662 |
| | | 714/6.32 |
| 2013/0244745 A1 | 9/2013 | Guziel et al. |
| 2018/0174128 A1* | 6/2018 | Deguara ................ G06Q 20/24 |

OTHER PUBLICATIONS

Int'l Search Report and Written Opinion dated Jan. 2, 2018 in Int'l Application No. PCT/IB2017/056378.

* cited by examiner

| Name | Description | Key | Values |
|---|---|---|---|
| All Numbers | Used to determine high-tier winner(s) | <drawId>_t_<number> | <ticketId> |
| Each number | Used to determine which tickets have won prizes by finding a ticketId that exists in multiple units | <drawId>_n_[1...59] | <ticketId> |
| Redemption | Used to maintain list of tickets which have been redeemed. This is updated on settlement in order to allow the remaining liability to be calculated. | <drawId>.redemption.<prizeLevel> | <ticketId> |

| Name | Description | Key | Values |
|---|---|---|---|
| Each Runner | Used to determine which bets are winners after the race has occurred: contains each bet which has mentioned the winner so that when calculating each pool's winners, the bets can be assessed. | <drawId>_r_<runner_number> | <ticketId> |
| Each Ticket | Used to determine the winning ticket for certain pools: may not be required, depending on the pools offered | <drawId>_t_<ticketId> | (bet data) |
| Each Pool Value | Used to maintain the value bet against each pool to allow winnings to be calculated. | <drawId>_p<pool_name> | (bet value) |
| Redemption | Used to maintain list of bets which have been redeemed. This is updated on settlement in order to allow the remaining liability to be calculated. | <drawId>_redemption_<pool_name> | <ticketId> |

FIG. 6C

| Name | Description | Key | Values |
|---|---|---|---|
| Each Number | Used to locate the set of cards which contains each number. | <drawId>_r_[1..x] | <cardId> |
| Each Card | Used to store the Bingo card configuration for each card which has been issued in order to allow rapid validation of a claim on a prize. | <drawId>_r_<cardId> | (card data) |
| Redemption | Because bingo has few winning tickets, redemption data is preferably written directly into non-volatile memory. | | |

FIG. 7D

METHOD AND APPARATUS FOR STORING A PLURALITY OF WAGER DATA FROM A PLURALITY OF INDIVIDUAL WAGERS IN A PARIMUTUEL WAGERING SYSTEM

CROSS-REFERENCE TO RELATED APPLICATIONS

This application relates to U.S. patent application Ser. No. 15/641,664 filed Jul. 5, 2017 entitled "METHOD AND APPARATUS FOR STORING A PLURALITY OF WAGER DATA FROM A PLURALITY OF INDIVIDUAL WAGERS IN A LOTTERY DRAW GAME."

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present invention relates to lottery parimutuel game network systems that are typically installed within a lottery's jurisdiction and are normally controlled from a central site with a large infrastructure such as Storage Area Networks ("SANs"), databases, application servers, and network infrastructure that is managed with a team of skilled system administrators, network specialist, and technicians. Additionally, the present invention also enables efficacies hereunto realized for "Class II" Bingo machines operating in a networked environment. Specifically, the present invention provides efficient and scalable methods of constructing parimutuel and Bingo game network systems at a substantial cost savings with previously unknown real-time monitoring and status capabilities.

2. Background

Whenever a lottery is established in a jurisdiction, a network comprising special purpose lottery terminals, communications links, and central site system(s) are installed. In large jurisdictions, the costs of installing this system can be onerous. Thus, the lottery network system is extensive with lottery terminals physically placed in every lottery retailer's place of business, a closed communications link (e.g., Virtual Private Network—"VPN"), and a central site. This equipment and a closed network system is typically created, installed, and maintained by a lottery vendor at significant expense. In some lottery jurisdictions (e.g., Florida, New York, California, France, Pennsylvania) the number of field terminals and associated individual closed network connections can number in the tens of thousands. In fact, it is not unusual for lottery vendors to report decline in revenue the next fiscal quarter or two after winning a major lottery system contract due to the substantial upfront investment required to manufacture and place the multiplicities of lottery terminals in the field, setup the network, and develop the central site.

In addition to the significant costs to the lottery vendor, the lotteries themselves are also burdened with the size and complexity of the lottery network system. Flattening sales curves for lottery products have forced lotteries to negotiate smaller and smaller margins from lottery vendors. However, given the significant draw game lottery network system infrastructure costs, there are limits to the margin reductions offered by vendors.

Another cost element is the lottery draw game ticket itself. In most instances, mere possession of a winning lottery ticket entitles the holder to the winnings. Thus, authentication of the presented lottery ticket is critically important. For example, lottery draw game tickets which are common in many countries and states are, by necessity, printed and presented to the purchaser in real-time with transactional data printed on the lottery ticket via a thermal or impact printer. To enhance security, lotteries typically use preprinted ticket stock with serial numbering on the back of the printing substrate as well as fluorescent and other inks on the ticket substrate to help prove authenticity and integrity. The preprinted serial numbering provides much of the security in determining the authenticity of a winning ticket because the distribution of the preprinted serial number ticket stock is maintained by an entity separate from the one controlling the printing of transactional data. When a winning ticket is presented for redemption, an audit trail can be established between the ticket stock serial number and the transactional data.

However, this added paper stock security has the disadvantage of high cost, as well as the logistics of tracking the ticket stock. Also, the labor-intensive nature of correlating the ticket stock to a draw game lottery ticket printed at a given retailer at a given time typically prohibits the method's use for all but high-tier winning tickets. Finally, it may be possible for an insider with access to the system controlling the printing of transactional data to simply purchase a lottery ticket from a retailer shortly after it was determined that that a high tier winner was sold at that location to thereby gain illicit knowledge of the appropriate ticket stock serial number range. While some notable attempts have been made to eliminate the need for security paper stock for bet tickets—e.g., U.S. Pat. No. 7,788,482 (Irwin) and U.S. Pat. No. 8,037,307 (Irwin)—the industry has been reluctant to adopt these cost savings technologies primarily due to the complexity of the draw game system and network with the inherent concern that any realized savings in paper will be offset by increased latency times when issuing draw game tickets.

In addition to costs, traditional lottery draw game lottery network systems tend to be relatively static and inflexible designs comprised of Oracle® or other SQL (Standardized Query Language) database cluster for software with high end servers and Storage Area Networks (SANs) for the storage infrastructure. System scalability with this type of configuration is notoriously difficult, typically with a "one size fits all" design approach with most lottery central sites being scaled for the largest conceivable system perhaps with smaller systems receiving slower processors. As is apparent to one skilled in the art, this type of system configuration does not readily accommodate economies for smaller lotteries and can potentially introduce problems in the future if new draw games are introduced that were not foreseen by the original system architects. Furthermore, this relatively inflexible system design also does not readily accommodate redundancy with backup central sites that are basically a copy of the primary site typically located in a different geographical location with high speed communications channels linking the two sites to ensure synchronization.

Furthermore, the relatively static and inflexible designs typical of Oracle or SQL database clusters of the prior art, prohibit draw game cancellation of a bet or wager once it is made. At the very least, this probation on canceling already logged wagers is an inconvenience to the retailer often forcing him or her to pay for wagers if the consumer claims to "not have wanted those numbers" or simply walks away.

Aside from cost, scalability, and operability issues, the complexity of traditional lottery network systems inherently prohibits accessing draw game betting data in real time—i.e., the requirements to print bet tickets within a relatively short time period (e.g., less than three seconds) typically prohibit most types of real time data mining for fear of slowing bet processing and ticket printing. This prohibition of real time data mining other than cursory information (e.g., total number of tickets or bets sold) impacts potential features that could possibly increase sales.

For example, most large draw games (e.g., Powerball®, Mega Millions®) are parimutuel in nature (i.e., where the pools of winnings are equally shared amongst all winners of a particular level) with the consequence of a large number of winners for any given drawing will result in each winner realizing a significantly reduced prize. Frequently, the most played numbers in Powerball® are "01-11-21-31-41 with a Powerball of 09" because on many lottery Powerball® bet slips coloring in these areas produces a diagonal line pattern. Additionally, on one occasion, one hundred and ten winning Powerball® players all played "22-28-32-33-39 with a Powerball of 40" due to a collective fortune cookie prediction—i.e., each player making the "22-28-32-33-39 with a Powerball of 40" wager did so because of the same fortune cookie ticket. If it were possible to inform a player before making a bet that "X" number of players have already made this wager, the correspondingly decreased return on investment of a group of winners sharing a common prize fund would be flagged, potentially increasing sales.

In addition to potential sales enhancements, real time data mining during draw game wagering also has the potential to increase security. For example, at least one United States (US) national draw game (i.e., "Hot Lotto®") was compromised by an insider who fraudulently purchased on the $23^{rd}$ of December 2010 a draw game ticket that ultimately won $14,300,000 in a subsequent "Hot Lotto" drawing. Apparently, the fraud was committed by the insider installing a software "root kit" that forced the outcome with the Random Number Generators (RNGs) used for the errant "Hot Lotto®" drawing to generate predetermined numbers. However, since there were two RNGs employed with the output of only one RNG used for the "Hot Lotto" drawing, the insider not knowing which RNG would be used for the official drawing was forced to purchase winning tickets for both possible RNG outcomes. Thus, a real-time search through all purchased draw game ticket bets for a given drawing that was conducted immediately after the drawing was concluded, but before the results were made public, could potentially flag fraud in this type of situation assuming winning tickets when both RNG outcomes were purchased for the same drawing.

These types of lottery draw games, where prizes are awarded and paid out based on both the total amount staked as well as how many tickets are winners is known in the art as "parimutuality." The term "parimutuality" is used to differentiate these types of games from a true parimutuel game where: bets are placed on an outcome, the payout per winner is determined by the sum of all bets (less the house take), and the potential payout is only approximately known at the time the wager is made. For example, if the "parimutuality" game Powerball® realized sales of $100,000,000 with a 50% prize fund and only one ticket had the winning numbers for that drawing the ticket holder would be awarded the entire $50,000,000. Powerball® prize fund. However, if there were two winning tickets for the same $50,000,000 prize fund drawing, each ticket holder would only receive $25,000,000, and so on. In contrast, in a true parimutuel game (e.g., horse race) the winning amounts would still be determined by the money wagered, however the exact payout would be known to the consumer at the time of the wager. Thus, true parimutuel game wagering systems are typically more complex, because there are usually different types of bets (e.g., exacta, each way, trifecta), also, referred to herein as a "wager selection." Also, bets may be for different amounts, and a bet may be occasionally refunded (e.g., horse withdraws due to illness prior to the race). Typically, true parimutuel systems tend to be smaller in scale than lottery systems and therefore real-time calculations of complex wagers are possible due to the system's smaller size. Nevertheless, as technology expands, it may become desirable in the future to provide large scale parimutuel wagering systems where various entities (e.g., casinos) are networked together to provide a common (i.e., larger) prize fund. With these types of larger scale systems, traditional (i.e., prior art) parimutuel wagering systems may no longer function properly.

In addition to "parimutuality" and true parimutuel games, "Class II" Bingo machines also typically operate over a draw game type system, thereby allowing multiplicities of players to compete with each other. However, like true parimutuel games, these systems and networks tend to be small in scale typically only servicing a single tribal casino at a time. Thus, due to the relatively small scale of the Bingo system and the corresponding prize fund, the prizes are limited for typical "Class II" Bingo play.

Prior art related to providing real time processing and updates of bets for parimutuel wagering systems tend to be focused on horse race tracks—e.g., U.S. Patent Application Publication No. 2009/0131132 (Kohls et. al.). However, horse race tracks are relatively small networks where delivering parimutuel odds and other data in real time or near rear time does not pose any significant computational challenge. Lottery systems however are a different matter, the sheer scale of typical lottery systems dwarf horse race track parimutuel wagering systems with a network of thousands and tens of thousands field terminals continuously accepting bets for draw games. Thus, prior art horse race track parimutuel wagering systems do not address the fundamental problem of providing real time data for larger scale systems. Lottery-related draw game systems prior art tends to exclusively focus on new types of games and the systems to support them with no regard to processing efficiencies—e.g., U.S. Patent Application Publication Nos. 2003/0050109 (Caro et. al.); 2004/0058726 (Klugman); 2009/0131132 (Kohls et. al.); 2009/0227320 (McBride); 2010/0222136 (Goto et. al.); 2011/0281629 (Meyer); 2013/0244745 (Guziel et. al.); and U.S. Pat. No. 8,747,209 (Badrich).

Therefore, it is desirable to develop scalable methods of constructing efficient draw game "parimutuality" and true parimutuel network systems. These draw game network system efficiencies can be potentially leveraged to provide hitherto unknown lower costs. Ideally, these draw game network system efficiencies could enable real time updating of betting data and associated data mining with large scale systems.

SUMMARY OF THE INVENTION

Objects and advantages of the present invention will be set forth in part in the following description, or may be obvious from the description, or may be learned through practice of the present invention.

A method and system are provided for efficient draw game network systems utilizing commodity hardware. The efficiency of the present invention is principally derived from preprocessing of all necessary metrics when a wager is made, as well as a scheme to allow volatile in-memory data to be used safely for financial calculations, even in the event of a total system outage. Because of the efficiencies enabled from the present invention, hitherto unknown operational abilities (e.g., real time feedback and canceling of wagers before a drawing for "parimutuality" system as well as scalable parimutuel systems) are enabled.

Described are mechanisms, systems, and methodologies related to constructing efficient draw game network systems utilizing commodity hardware thereby enabling methods of inexpensive operation while also enabling hitherto unknown real time betting feedback. The efficiency of the present invention is principally derived from preprocessing all bet data into metrics and storing the metrics primarily within volatile memory—i.e., high-speed and volatile Random Access Memory ("RAM"). Despite the primary utilization of volatile RAM processing, in the event of a system outage, volatile RAM data can be reconstructed with 100% accuracy from non-volatile data—i.e., from slower speed non-volatile memory (e.g., disk data, flash data). The non-volatile data is first processed by a mathematical operation for each wager at the time the wager is made, essentially allowing the non-volatile wager data to be distributed and stored among n sets of non-volatile storage devices. The key innovations are the preprocessing of all necessary metrics at the time a wager is made, thereby enabling high-speed volatile data processing while enabling techniques to allow all wager data to also be stored safely in parallel non-volatile memory for betting. This process enables 100% recovery even in the event of a total system outage while still enabling real time bet processing.

In a general embodiment, a draw game network system is disclosed that provides significantly greater throughput while utilizing lower cost commodity hardware than is commonly available via prior art systems. The efficiencies of the present invention are achieved from data preprocessing at the time of sale as well as maintaining a copy of the summation of all bet data in volatile memory.

As an inherent aspect of this general embodiment, the disclosed efficient draw game network architecture readily accommodates horizontal scalability and redundancy without the need for extensive reengineering or expensive hardware additions. The preprocessing of data at the point and time of sale inherent in the design permits draw game bet data to coexist in both high-speed volatile (e.g., RAM) memory as well as lower-speed non-volatile memory (e.g., disk or flash) that is distributed by an arbitrary modulus function into n units of persistent storage. These n units of persistent non-volatile storage are typically spread over multiplicities of low-cost processors and data storage devices thereby enabling horizontal expansion and redundancy without the need to redesign the underlying hardware system architecture.

This inherent aspect of horizontal scalability is further maintained after the drawing process is completed—i.e., after sales for a particular draw game are closed and the winning sequence of numbers or other indicia is determined. After the drawing process is completed, the high-speed volatile memory is utilized to calculate the minimal data necessary to allow each ticket to be settled without attempting to settle all tickets at that time. When individual winning tickets or other tokens are presented for redemption, this pre-calculated settlement data is compared to the ticket data presented for validation thereby allowing rapid settlement. Thus, the pre-calculated settlement data along with the inherent sporadic presentation of winning tickets for redemption ensures that any system architectural design that is scaled to be capable of accommodating sales volume will also easily accommodate supplementary redemptions. As part of this settlement process and overall design, the hereto unknown ability to cancel wagers for lottery draw games before a given drawing may be supported by the present invention.

In a specific embodiment, the efficient draw game network system enabled by the present invention provides real time queries of bet data allowing previously unknown methods of real time data mining. These real-time data mining methods thereby facilitating potential processes for increasing sales via real time customer engagement as well as the potential for enhanced security.

In another specific embodiment, the efficient draw game network system supports the creation and maintenance of a dynamic hash chain ledger that establishes a foundation for the creation of digital Message Authentication Codes ("Macs") or digital signatures that can be appended to bet ticket serial numbers and ancillary data printed on the ticket. These Macs or digital signatures providing digital authentication for bet tickets presented for redemption such that the need for secondary authentication via secure ticket stock becomes unnecessary.

Described are a number of mechanisms and methodologies that provide practical details for reliably developing an efficient draw game network system from commonly available (i.e., low cost) hardware that also provides for scalability. Although the examples provided herein are primarily related to lottery draw games, it is clear that the same methods are applicable to any type of parimutuel wagering system.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 4A is a representative example matrix defining the draw game data that is stored that is compatible with the general embodiments of 1A, 1B, and 1C;

FIG. 6C is a representative example matrix defining the game data that is stored with the life cycle of a true parimutuel draw game that is compatible with the embodiments of FIGS. 6A and 6B;

FIG. 7D is a representative example table listing the various states associated with the life cycle of a "Class II" Bingo draw game that is compatible with the embodiments of FIG. 7A.

DETAILED DESCRIPTION OF THE INVENTION

Figure 1A:
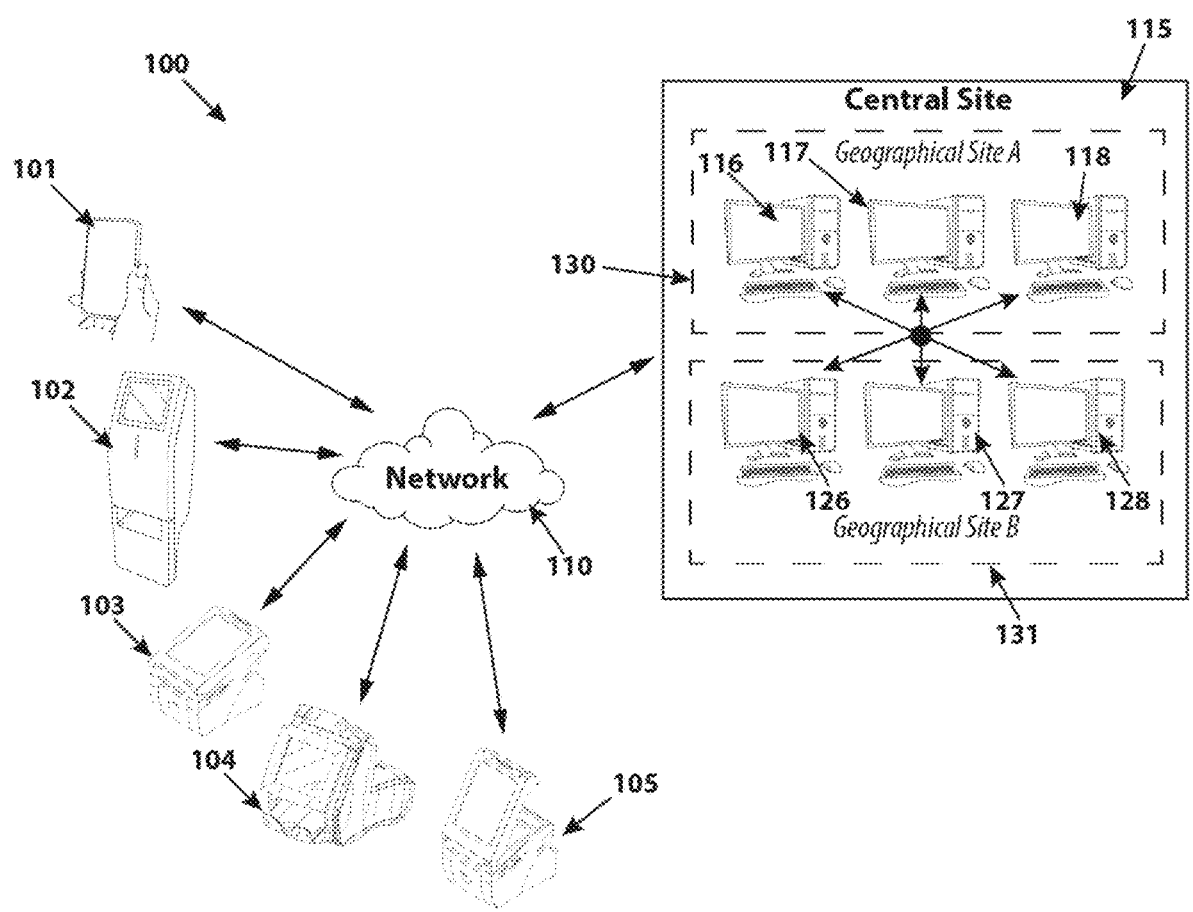
FIG. 1A is a representative example hardware block diagram of an efficient draw game network system embodiment as enabled by the present invention.

Certain terminology is used herein for convenience only and is not to be taken as a limitation on the present invention. The words "a" and "an", as used in the claims and in the corresponding portions of the specification, mean "at least one." In the context of the present invention, "volatile" data or memory refers to computer memory that requires power and uninterrupted processing to maintain the stored information—i.e., it retains its contents while powered on but when the power or processing is interrupted, the stored data is lost immediately or very rapidly. "Volatile" data or memory is typically utilized as main memory. The principle advantage of "volatile" data or memory is that it is typically much faster than forms of "non-volatile" memory or mass storage (e.g., hard disk drive, flash drive). Additionally, volatile memory can protect sensitive information as it becomes unavailable on power-down. Most of the general-purpose computer Random Access Memory (RAM) is volatile. In contrast, "non-volatile" memory or mass storage is a is a type of computer memory that can retrieve stored information even after having been power cycled (i.e., turned off and back on) or the primary processing is interrupted. Examples of "non-volatile" memory include read-only memory, flash memory, ferroelectric RAM, most types of magnetic computer storage devices (e.g., hard disk drives, floppy disks, and magnetic tape), optical discs, and the like. "Non-volatile" memory is typically used for the task of secondary storage, or long-term persistent storage. Typically, non-volatile memory costs more, provides lower performance, or has worse write endurance than volatile random access memory.

This patent application includes an Appendix having a file named appendix689201-7US.txt, created on Mar. 15, 2018 and having a size of 7,057 bytes. The Appendix is incorporated by reference into the present patent application. One preferred embodiment of the present invention is implemented via the source code in the Appendix. The Appendix is subject to the "Copyright Notice and Authorization" stated above.

The Appendix includes the following parts:

Part 1: A representative example code snippet for ticket structure memory storage compatible with the embodiment of FIGS. 4A and 4B.

Part 2: A representative example code snippet for establishing a Bet Queue and Bet Process that is compatible with the general embodiments of FIGS. 1A, 1B, and 1C.

Part 3: A representative example code snippet for determining winning tickets that is compatible with the general embodiments of FIGS. 1A, 1B, and 1C.

Part 4: A representative example code snippet for establishing a Message Authentication Code (Mac) that is compatible with the general embodiments of FIGS. 1A, 1B, and 1C.

A "wager" or "bet" as used interchangeably in the claims and in the corresponding portions of the specification means a gamble on predicting the outcome of a drawing in the future. A "ticket" denotes a "payable on demand" document either printed (e.g., FIG. 2A or FIG. 2B) or virtually transferred certificate authenticating the wager transaction. A "draw game identifier" or simply a "game identifier" refers to information or data that uniquely identifies a specific wager while not necessarily identifying the identity of the individual or consumer making the wager. Examples of "draw game identifier" data would be the type of drawing (e.g., Keno, Pick 3, Pick 4, Powerball®, Kentucky Derby®), the time and date of the wager and the scheduled drawing, a unique serial number assigned to the particular wager, the numbers or indicia wagered to appear in the scheduled drawing, the wager amount, and the like. In some embodiments, the "draw game identifier" or "game identifier" may also include a location (e.g., specific horse race track) as well as a race position in a queue (e.g., which horse race (e.g., $1^{st}$ race, $2^{nd}$ race) for a given date) rather than a specific time. In most embodiments, the "draw game identifier" or "game identifier" data would not include any information about the consumer, since these embodiments typically produce a "payable on demand" ticket that can be redeemed after a winning drawing occurs. In other embodiments, the consumer's identity can be linked directly to the "draw game identifier" data. These embodiments are typically associated with Internet wagering with pre-established accounts, where no anonymous "payable on demand" ticket is produced.

Also, in the context of the present invention, "bet type" refers to variations on the type of wager for a given drawing where more than one possible wager or bet type is possible. Examples of various "bet types" include the Power Play® option in Powerball® add-on for an additional $1 per play where a separate drawing is performed to select the Power Play® number (i.e., "2", "3", "4", or "5") for all prizes except the jackpot; the Match 5 prize; Pick 3 or Pick 4 straight or boxed wagers; standard bets and way bets in Keno; and the like.

Additionally, in the context of the present invention, the term "parimutuality" refers to a lottery type draw game where bets are placed on an outcome, the payout per winner is determined by the sum of all bets (less the house take), and the potential payout is known only approximately at the time the wager is made. In contrast, in a true parimutuel game (e.g., horse race, greyhound racing, jai alai, sporting events with ranked outcomes), the winning amounts would still be determined by the money wagered. However the exact payout would be known to the consumer at the time of the wager with the payout being principally determined by the total amount of money already wagered and how the wagers are distributed among potential outcomes. Finally, the term "Class II" gaming is defined for the purposes of the present invention as games of chance conducted at tribal casinos under the U.S. Indian Gaming Regulatory Act. "Class II" games include Bingo (whether or not electronic, computer, or other technological aids are used in connection therewith). Finally, a "betting field" or "wager field", which are used herein interchangeably refers to the subset of indicia or entities for a given drawing that a consumer has selected and wagered as a prediction of a particular draw game outcome—i.e., potentially winning combination of ping pong ball numbers, horses, Bingo card, and the like.

Constructing efficient draw game network systems utilizing commodity hardware requires multiple data depositories, segmentation, synchronized release of information, and coordination. Dividing data archival functionality across among n sets of non-volatile storage devices while simultaneously preprocessing all bet data into metrics and storing the metrics within volatile memory enables greater efficiency and reduced system latency than has been previously realized. Segregating non-volatile storage devices among n sets allows for ready compartmentalizing of data storage for efficiency and security as well as horizontal scalability. Preprocessing all bet data into metrics and storing the metrics within volatile memory dramatically increases speed and correspondingly real time data accessibility. This increased real time data accessibility in turn enables hereto unknown marketing and sales information (e.g., number of consumers wagering the same number or indicia) availability both to the consumer and the lottery staff as well as potentially enhanced security—e.g., flagging when parallel RNG outcomes were purchased for the same drawing, adding central site generated Message Authentication Codes (Macs).

Reference will now be made to one or more embodiments of the system and methodology of the present invention as illustrated in the figures. It should be appreciated that each embodiment is presented by way of explanation of aspects of the present invention, and is not meant as a limitation of the present invention. For example, features illustrated or described as part of one embodiment may be used with another embodiment to yield still a further embodiment. These and other modifications come within the scope and spirit of the present invention.

Figure 1B:
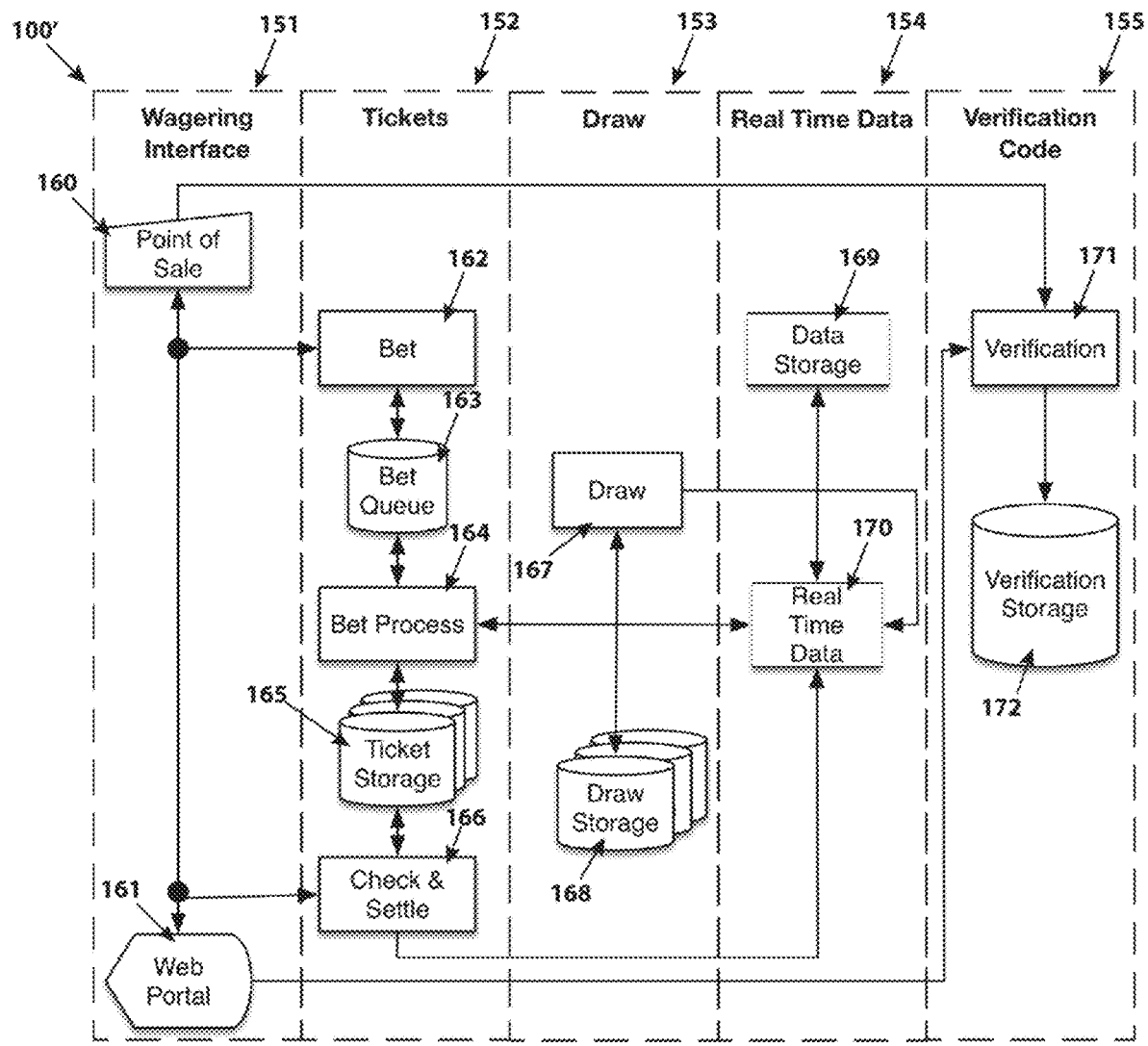
FIG. 1B is a representative example high level architecture swim lane diagram of the key components associated with processing and redeeming bets on the efficient draw game network system embodiment of FIG. 1A.
Figure 1C:
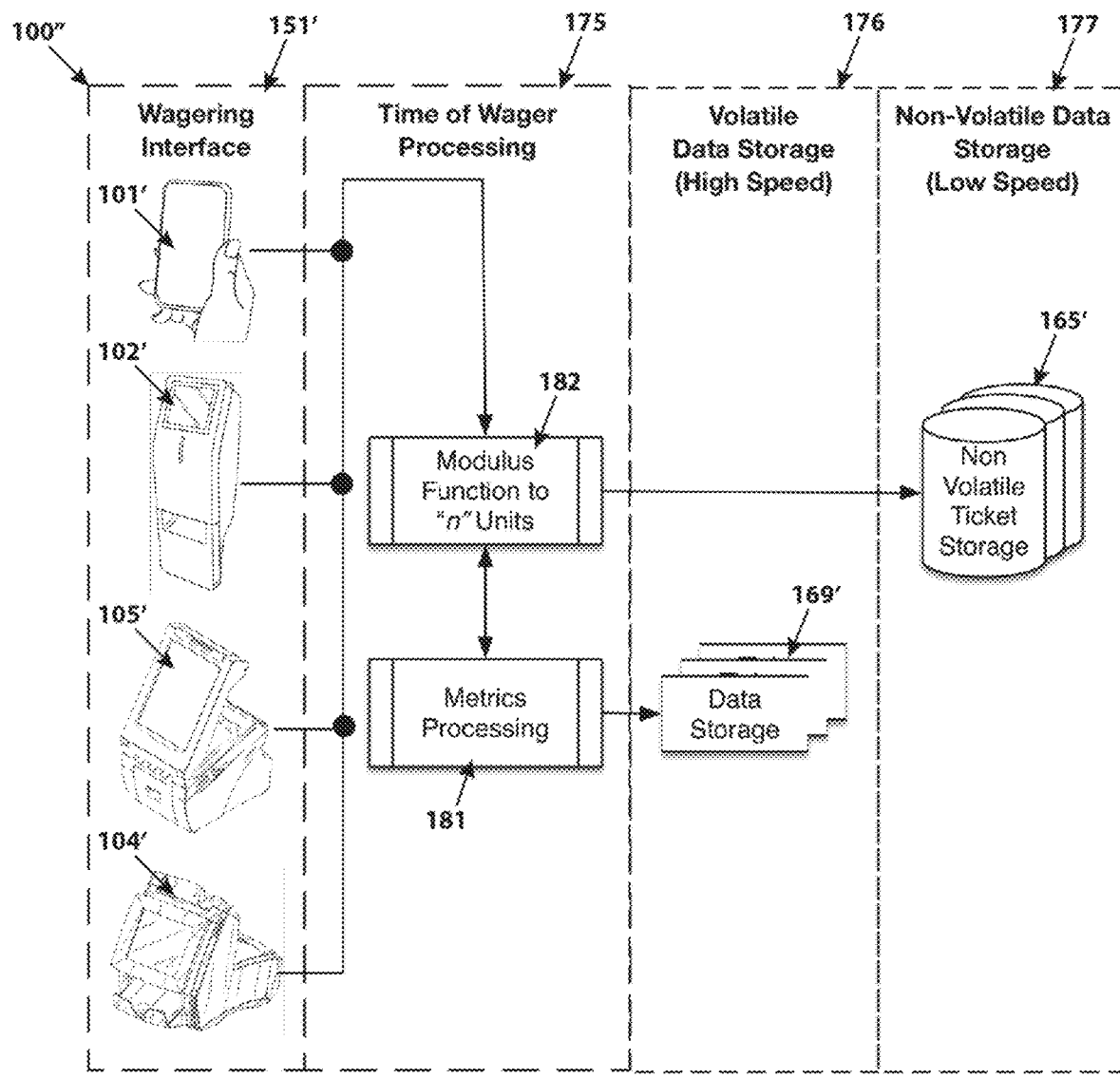
FIG. 1C is a representative example swim lane block diagram highlighting the parallel utilization of volatile and non-volatile data storage which is compatible with the embodiments of FIGS. 1A and 1B.

FIGS. 1A, 1B, and 1C taken together, illustrate the general embodiment 100 of the present invention, which seamlessly integrates commodity hardware into an efficient draw game network system. FIG. 1A is an overall representative example block diagram of the general embodiment 100 illustrating generic Point Of Sale (POS) devices as well as personnel devices that register wagers made by the consumer through a network to a primary and backup central site where the wagers are recorded and a confirmation is relayed back to the consumer. FIG. 1B depicts a swim lane flowchart providing a schematic graphical overview of the general embodiment of the present invention. As illustrated in FIG. 1B embodiment 100', system-level division of data storage, segregation, and augmentation of digital databases is conceptually divided into five groups (i.e., Wagering Interfaces 151, Tickets 152, Draw 153, Real Time Data 154, and Verification Code 155) by the five "swim lane" columns from left to right. Whichever "swim lane" a flowchart function appears within its functionality is limited to the data category of the associated swim lane—e.g., web portal 161 is within the segregated domain of user 151. FIG. 1C depicts another swim lane flowchart 100" providing a schematic graphical overview highlighting the parallel utilization of volatile and non-volatile data storage as an integral part of the present invention. The four swim lanes illustrated in FIG. 1C are Wagering Interface 151', Time of Wager processing 175, volatile data storage 176, and non-volatile data storage 177.

A representative example diagram 100 of a general efficient draw game network system embodiment is illustrated in FIG. 1A. Similar to prior art draw game systems, embodiment 100 can be logically divided into three portions:

Wagering Interface Portion—the system portion (101 through 105) that accepts wagers from consumers and typically provides "payable on demand" documentation Network Portion—the system network portion 110 that provides secure communications links between the Wagering Interface Portion and the Central Site 115

Central Site Portion—the system portion 115 that generates the ledger of record for all wagers received, generates bet ticket data, generates summary reports, determines winning wagers and/or tickets, and provides overall security monitoring Like prior art draw game systems, embodiment 100 can accept wagers from multiplicities of different types of devices including different types of lottery terminals (103 through 105), lottery kiosks 102, and consumer devices 101 via the Internet. Also, the network 110 utilized by embodiment 100 is similar to prior art draw game systems.

The principle difference between prior art draw game systems and embodiment 100 lies in the central sites 115. Rather than relying on high performance servers that are an integral part of a SAN with a large infrastructure that is managed with a team of skilled system administrators, network specialist, and technicians, embodiment 100 utilizes commodity computers or servers (116 through 118 and 126 through 128) configured in a cluster draw game network architecture that readily accommodates horizontal-scalability and redundancy when needed, as well as optional enhanced geographical redundancy realized from spreading the central site cluster 115 over at least two different physical locations (130 and 131). This preferred optional cluster spreading over multiple physical locations (130 and 131) inherently provides greater fault tolerances such that any physical location would automatically continue operations (e.g., 131) if another site (e.g., 130) suffers a catastrophic failure.

This horizontal-scalability and redundancy is possible since all wager or bet data is preprocessed into metrics with the resulting metrics stored primarily within volatile memory (i.e., high-speed RAM) with the volatile RAM metrics retrievable with 100% accuracy from slower speed non-volatile memory (e.g., disk data, flash data). The non-volatile memory records each bet or wager by first applying a mathematical operation for each wager at the time the wager is made, essentially allowing the non-volatile wager data to be distributed and stored among n sets of horizontally scalable non-volatile storage devices.

As shown in the high level architecture swim lane diagram 100' of FIG. 1B, there are five functional components (i.e., Wagering Interface 151, Tickets 152, Draw 153, Real Time Data 154, and Verification Code 155) of the present invention typically residing in separate devices or computing devices. The Wagering Interface 151 (i.e., POS 160 and Web Portal 161) provides the transaction portal(s) that interact with specific consumers and/or operational staff, thereby enabling wagers or bets to be sold. All wagers or bets received by the Wagering Interface 151 are passed to the Tickets component's 152 Bet service 162. After a given drawing is closed and the winning numbers or indicia are determined, any apparent winning wager tickets presented for redemption to the Wagering Interface 151 are passed to the Check & Settle 166 service for validation and payment authorization. Optionally, the Wagering Interface 151 devices may also interface with the Verification Code 155 component's Verification 171 service for generating, storing 172, and validation ticket Message Authentication Codes (Macs).

Once a pending wager or bet is received by the Bet service 162 a unique serial number is assigned to the wager and the wager is passed to the Non-Volatile Bet Queue database 163 (also referred to as a "non-volatile data storage bet queue"), which effectively maintains the pending wager in a First In First Out (FIFO) buffer while waiting for initial processing by the Bet Process service 164. When ready, the Bet Process service 164 receives the pending wager and performs two functions correlated to the pending wager's data:

Generate key metrics—calculate key metrics from the pending wager that essentially compress all data necessary to: log a specific wager or bet, flag the specific drawing associated with the wager or bet, verify if a given wager is a winner after the drawing occurs, support global summary reports, and the like, ultimately resulting in a structure for each wager or bet of minimal settlement data that can be stored in high-speed volatile (e.g., RAM) memory in multiplicities of servers or processors, preferably (for added redundancy) over different geographical locations.

Assign each wager to one of n sets of non-volatile storage devices use an arbitrary mathematical operation on the unique wager serial number assigned by the Bet service 162 to store the wager in any one of n sets of Non-Volatile Ticket Storage devices 165 (e.g., disk data, flash data). In a preferred embodiment, this mathematical operation is a modulus function.

Once the Bet Process service 164 has completed the previously described two pending services, it logs the wager in both high-speed volatile Data Storage memory 169 (i.e., as embodied by the key metrics) via the Real Time Data service 170, as well as lower-speed Non-Volatile Ticket Storage memory 165 (i.e., all raw bet data assigned to one of n sets). After the wager is initially logged in the non-volatile Bet Queue 163, the Bet Process service 162 transmits an acknowledgement of the completed wager back to the wagering interface 151 (POS 160 and Web Portal 161) that initiated the wager request, ultimately culminating in a "payable on demand" ticket (i.e., POS terminals 160) or a log on a Web Portal 161 with a unique ticket serial number, to ensure that responsiveness is maintained. After the Bet Process service 164 has completed its processing, it removes the ticket from the Bet Queue 163.

At some time before the actual drawing (e.g., one hour), the draw game system will no longer accept new wagers with the system effectively assuming a "No More Bets" state. After the No More Bets state is implemented and all pending wagers are secured, a drawing (e.g., ping pong ball selection, RNG) will occur to determine the winners. Once the drawing is completed and certified, the drawing results are logged into the Draw service 167 (usually by two lottery personnel keying in identical numbers or indicia on two different keyboards with the Draw service 167 verifying that both entries were identical). The entered draw results are first saved in Non-Volatile Draw Storage 168 to enable the system to identify winners for the completed drawing. The Draw service 167 and associated non-volatile Draw Storage 168 record the given draw results with the associated time and date as well as various aggregate details (e.g., hash of all bet data for the drawing, size of the winning pool of tickets, number of total bets, payout per ticket, potential anomalies of the drawing) while typically (for reasons of efficiency) recording no individual information of the wager tickets or serial numbers issued.

When a winning ticket or serial number is presented to a Wagering Interface 151 device (POS 160 and Web Portal 161) for redemption, the Check & Settle service 166 receives the redemption request and queries the non-volatile Ticket Storage 165 to determine if the ticket or serial number presented is a valid winner and if it has not already been paid. Assuming the ticket or serial number is valid, the Check & Settle service 166 may optionally query the Draw service 167 to verify a ticket's winning status and if so, how much it won. Additionally, the Draw service 167 may check for any anomalies or updates, ultimately relaying the payment approval or rejection back to the Wagering Interface 151 that initially made the request. Assuming the ticket is in fact a winner and has not already been paid, the Check & Settle service 166 relays a payment authorization back to the Wager Interface device (POS 160 and Web Portal 161), and writes the paid status to the non-volatile Ticket Storage 165 memory.

Optionally, the Verification Code 155, which is an independent component that preferably is hosted in an entirely different location and/or by a third party, will respond to requests from a Wagering Interface 151 device with its Verification service 171 to generate a Mac and log the wager's Mac data in non-volatile Verification Storage 172 ultimately returning a Mac which can later be used to demonstrate that a winning ticket is legitimate.

FIG. 1C is an alternative swim lane diagram 100" of the same embodiment 100 (FIG. 1A) that highlights the processing that occurs when a wager is made and what portions of the wager data are saved in volatile 176 (FIG. 1C) and non-volatile 177 memory. As shown in the swim lane diagram 100", there are four functional components (i.e., Wagering Interface 151', Time of Wager Processing 175, Volatile Data Storage 176, and Non-Volatile Data Storage 177) of the highlighted diagram's high level architecture. As previously discussed, the Wagering Interface 151' (i.e., handheld user device 101', lottery POS kiosk 102', lottery POS terminal 104', and alternate lottery POS terminal 105') devices provide the transaction portal(s) that interact with specific consumers and/or sales staff, thereby enabling wagers or bets to be sold. All wagers or bets received by the Wagering Interface 151' from the consumer are passed to the Time of Wager Processing component 175. The two services within component 175 (i.e., Modulus Function to "n" Units 182 and Metrics Processing 181) perform the initial processing of the wager request such that hereto unknown draw game system efficiencies and scalability can be achieved while at the same time maintaining 100% recovery capabilities in the event of a system outage.

The Modulus Function to "n" Units service 182 (also, referred to herein as a "computer processor") employs an arbitrary mathematical operation (preferably modulus) on the pending wager's previously generated ticket serial number thereby allowing the complete wager data to be distributed and stored among n sets of non-volatile Ticket Storage memory 165'. Since this non-volatile Ticket Storage memory 165' is typically slower in response to processor requests, this complete copy of the wager data maintained in Non-Volatile Ticket Storage memory 165' is primarily intended for archival purposes only. Additionally, the non-volatile Bet Queue 163 also maintains a copy of all received wagers which have not yet been processed. The Bet Queue 163 primarily reduces the processing time for new wagers, as well as greatly reducing the time taken before bets may be accepted when recovering from a catastrophic failure. The high-speed volatile Data Storage memory 169' maintains the record or ledger of wagers for essentially all real time processing. One skilled in the art will recognize that other mathematical functions or algorithms may be utilized to save the complete wager data among n sets of Non-Volatile Ticket Storage memory 165". The essential concept is to ensure an approximate homogeneous distribution of wagers among the n sets of Non-Volatile Ticket Storage memory 165'.

The same pending wager data that was stored in one of n sets of the Non-Volatile Ticket Storage memory 165' is also applied to the Metrics Processing service 181. The Metrics Processing service 181 calculates key metrics (i.e., a compressed subset of minimal data necessary to record and redeem bets) of the pending wager data preserving a variety of specific data structures that can support all real time functional requirements. These key metrics are consequently calculated on ticket creation, rather than on query, thereby facilitating storage in high-speed volatile Data Storage memory 169'. In the event of a system outage and subsequent Data Storage memory 169' loss, the key metrics for a given drawing can be reconstructed from the persistent data maintained in the Non-Volatile Ticket Storage memory 165'. In an alternative embodiment, a copy of the key metrics generated at the time of the wager could also be stored in the Ticket Storage memory 165' with the complete wager data. This alternative embodiment has the advantage of a theoretical faster recovery time in the event of a system outage than recalculating the key metrics at the time of recovery. In another alternative embodiment, only the key metrics are stored in the Non-Volatile Ticket Storage memory 165' instead of maintaining a copy of the complete wager data. This embodiment has the advantage of faster recovery and smaller storage requirements with the possible disadvantage of incompatibility with legacy lottery audit, security, and forensic requirements.

Figure 2A:
FIG. 2A is a front elevation representative example of a prior art draw game ticket supported by preferred embodiments of the present invention.
Figure 2B:
FIG. 2B is a front elevation representative example of a draw game ticket that is compatible with a specific embodiment of the present invention.

FIGS. 2A and 2B provide alternate renditions of "payable on demand" draw game tickets 200 and 200' that are typically printed on lottery POS devices (e.g., 102 through 105 of FIG. 1A) at the time a wager is purchased. FIG. 2A provides a front elevation representative example of a legacy (prior art) draw game ticket 200 and FIG. 2B provides an optional enhanced draw game ticket 200' that would also support a specific embodiment of the present invention that includes appending a Mac for digital ticket authentication. Both the legacy 200 and enhanced 200' draw game tickets are supported by the present invention.

Among other graphics, the legacy draw game ticket 200 of FIG. 2A displays the numbers or indicia 201 that were wagered for a specified upcoming drawing 203. Also printed on the legacy ticket is a human readable serial number 202 as well as machine readable indicia 204 that typically embodies information similar to the human readable serial number 202. Both the human 202 and machine 204 readable serial number were generated by the Bet service 162 (FIG. 1B) after the wager was transmitted from the Wagering Interface 151. When a winning draw game ticket is redeemed, either the human 202 (FIG. 2A) or machine 204 readable serial (via keyboard entry) number is transmitted from the Wagering Interface 151 (FIG. 1B) to the Check & Settle service 166 which, in turn, queries the high-speed volatile Data Storage memory (169 of FIG. 1B and 169' of FIG. 1C) and Real Time Data service 170 (FIG. 1B) to determine if the ticket is a legitimate winner and not previously paid.

The optional enhanced draw game ticket 200' of FIG. 2B is almost identical to the legacy ticket 200 of FIG. 2A. As before, the optional enhanced draw game ticket 200' of FIG. 2B is printed with the numbers or indicia 201' that were wagered for a specified upcoming drawing 203'. However, with the enhanced draw game ticket 200', both the human readable 202' and machine readable indicia 204' serial numbers are modified to accommodate a much larger serial number. The human readable 202' serial number changed from a simple decimal encoding to alphanumeric, and the machine-readable indicia 204' serial number changed from a one dimensional (e.g., Interleave 2-of-5) to two-dimensional (e.g., PDF-417) barcode. This expansion of data capacity accommodates the optional appending of a 128, 256, or 512-bit Mac to support the optional Validation Code 155 (FIG. 1B) Verification service 171.

Figure 3A:
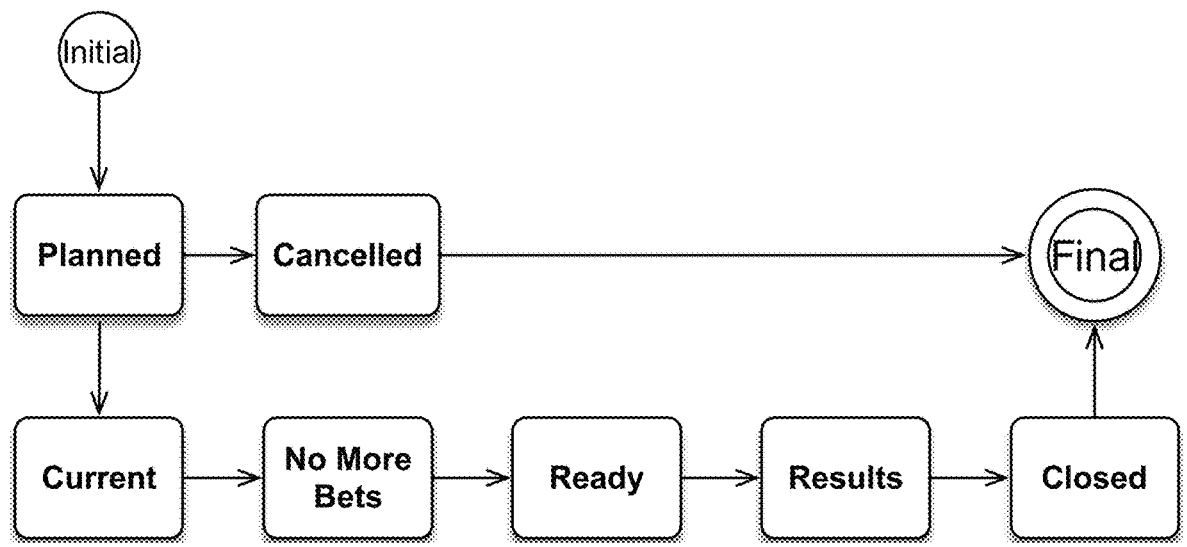
FIG. 3A is an overall logical state machine rendering representative example of the processes associated with operating a draw game compatible with the embodiments of FIGS. 1A, 1B, and 1C.
Figure 3B:
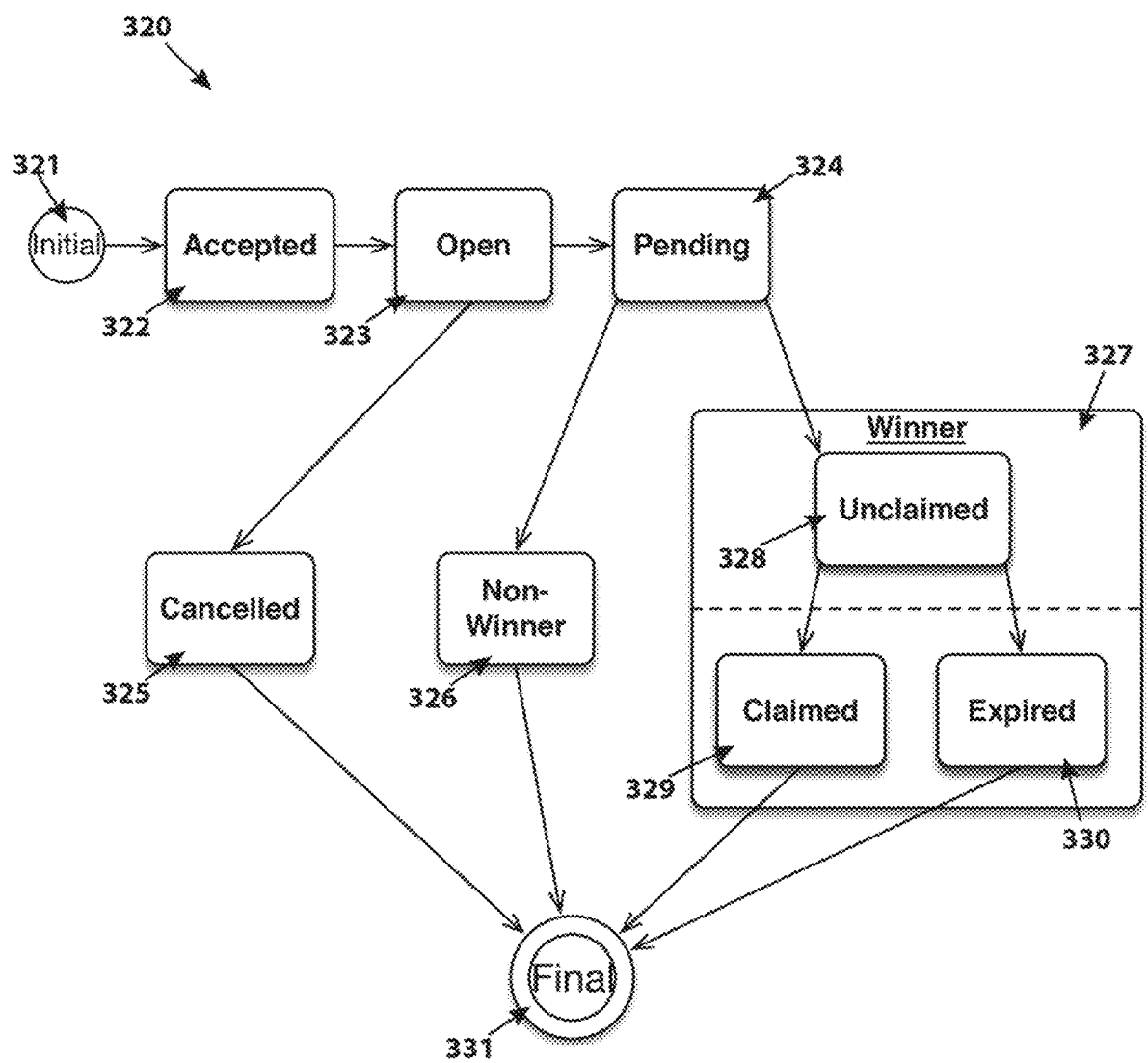
FIG. 3B is an overall logical state machine rendering representative example of the processes associated with issuing, canceling, and redeeming a draw game ticket compatible with the specific embodiment of FIGS. 1A, 1B, 1C, 2B, and 3A.
Figure 3C:
FIG. 3C is a representative example table listing the various states associated with the life cycle of a draw game ticket that is compatible with the embodiments of FIGS. 3A and 3B.

FIGS. 3A, 3B, and 3C taken together, describe the various states for drawing and draw ticket subsystems or machines of the present invention. FIG. 3A is an overall logical state machine rendering representative example of the processes or states associated with operating a draw game compatible with the general embodiment of the present invention. FIG. 3B is an overall logical state machine 320 representative example of the processes associated with issuing, canceling, and redeeming a draw game ticket (e.g., 200 of FIG. 2A and 200' of FIG. 2B) compatible with the specific embodiment 300 of FIG. 3A. Finally, FIG. 3C is a table 340 listing the various states associated with the life cycle of a bet ticket compatible with the state machine embodiment 320 of FIG. 3B.

The state machine example 300 of FIG. 3A graphically depicts the various logical states of a given draw game progressing from initialization 301 through the final close out 309. From its Initial state 301, a typical draw game progresses to a Planned state 302 where the future draw game is registered on the draw game system along with programmed rules for the drawing (e.g., select five ball numbers from a master set of sixty-nine possible, time deadline to stop sales for a pending drawing, "Doubler" enabled), but not necessarily accepting wagers. From this Planned state 302 the state machine can progress to one of two possible states. In some special circumstances a Cancelled state 303 (when for whatever reason the planned drawing is cancelled) would be adopted that effectively removes associated data from the draw system, then progresses to the Final state 309. However, normally, the drawing Planned state 302 progresses to the Current state 304, which effectively means that the drawing is available to accept bets or wagers. This Current state 304 will persist accepting wager sales until a predefined time (e.g., one hour) before the schedule drawing. At that time, the state machine will progress to its No More Bets state 305, meaning that the Bet service 162 (FIG. 1B) will no longer allow a wager to be placed on the pending drawing. This state continues until the actual drawing (e.g., ping pong balls, RNG) is conducted, at which point the state machine advances to its Ready state 306 (FIG. 3A) indicating that the draw game system (i.e., Draw service 167 and Draw Storage 168, both of FIG. 1B) has received and logged the drawing results, but the results are not yet certified (i.e., drawing results made official and publicly announced). Once the drawing results are certified, the state machine proceeds to its Results state 307 (FIG. 3A), thereby allowing the system to redeem winning tickets via its Check & Settle 166 service (FIG. 1B). After the period for redeeming tickets for a given drawing has expired, the state machine progresses to its Closed state 308 (FIG. 3A) where final accounting and archiving is performed for the existing drawing and all key metrics for wagers associated with the existing drawing are deleted from Data Storage 169 (FIG. 1B) high-speed volatile memory before the state machine concludes in its Final state 309 (FIG. 3A) for the existing drawing.

Running in parallel with state machine 300 while it maintains the various states associated with establishing a specific drawing, state machine 320 of FIG. 3B also runs providing the various logical states of a given draw ticket (e.g., 200 of FIG. 2A and 200' of FIG. 2B) progressing from initialization 321 (FIG. 3B) through the final close out 331. A graphic depiction of the various states 322' through 330' of the draw game ticket state machine 320 is illustrated in the table matrix 340 of FIG. 3C. In the matrix 340, the various ticket machine states are listed in the Ticket State 341 column with the associated Description 342, Draw State 343, Ticket Data 341, Winner? 345, Cancellation Data 346, and Redemption Data 347 descriptions located in the row associated with the given ticket state—e.g., all information associated with the Accepted state is shown in row 322'. Accordingly, for brevity the subsequent discussion will freely cross-reference FIGS. 1B, 3A, 3B, and 3C with the unique callout reference numbers also denoting the associated figure and no figure numbers specified.

A key concept in the draw ticket state machine 320 architecture is that the state of a wager may not be simply referenced from one central database—i.e., it will be deduced from data stored in multiple locations. Thus, the draw ticket state machine 320 avoids updating records, as this is a relatively expensive operation (both in terms of computation and time) and has poor uniformity in modern databases. For example, when a draw game ticket is redeemed, the old record is not updated. Instead, a new record is created in the same non-volatile n storage unit.

The draw ticket state machine 320 advances from its Initial state 321 (where no draw game ticket processing occurs) to its Accepted state 322 when a new pending wager is received. As described in the corresponding matrix row 322', the Accepted state 322 is when a pending wager has been received by the Bet service 162 where a unique serial number is assigned with the pending wager waiting in the Bet Queue 163. At the Accepted state 322 in the draw game ticket process, no Draw State 343 has been effected and consequently: no draw game Ticket Data logged 341, no Winning status 345 determined, no Cancellation 346, and no Redemption 347 statuses determined.

Once the pending wager progresses to the Bet Process service 164 and is logged in both volatile 169 and non-volatile 165 memory, an acknowledgement is sent back to the Wager Interface 151 that initiated the wager request, a draw game ticket is typically printed, and the state of the draw ticket state machine 320 changes to Open 323. In this Open state 323', all initial wager processing is completed with ticket data recorded on the system that is now part of the Current state 304 of the draw game state machine.

From the Open state 323 for a draw game ticket, there are two possible future states: Cancelled 325 or Pending 324. As its name implies, the Cancelled state 325 exists to enable the hereto unknown ability to cancel draw game tickets after the wager was logged, but before the No More Bets state 305 time-period begins. If a cancellation is requested within the allowable time-period (i.e., before the Open state 323 progresses to the No More Bets state 305), the draw ticket state machine 320 will change the associated draw game ticket's data from the Open state 323 to the Cancelled state 325. This cancelled state 325' leaves extant persistent data of the draw game ticket, as well as a new data entry, flagging that the associated draw game ticket has been canceled. This Canceled state 325 persists until the associated draw game's redemption period has expired and the associated draw game data is archived for long term storage and taken off the real-time system in its Final state 331. For draw game tickets that were not cancelled, their data persists in the Open state 323 until the No More Bets state 305 is achieved on the draw game state machine 300. At this point, the draw ticket state machine 320 changes all remaining ticket Open states 323 to Pending states 324 for all tickets associated with the No More Bets 305 drawing. This Pending state 324' remains so long as the No More Bets state 305 persists in the game state machine 300 with the ticket data remaining in memory.

Once the drawing is completed and made official, the draw game state machine 300 progresses to its Results state 307 with all tickets associated with the given drawing changing to either a Non-Winner 326 or Winner 327 state. The Non-Winner state 326 is the state reserved for all tickets that did not win any prize after the drawing occurred and its results were made official. This Non-Winner state 326' is the state of all tickets after a drawing that did not win a prize. All Non-Winner state 326' ticket data is maintained in both volatile 169 and non-volatile 165 memory until the time-period for redemption of the related drawing expires and the associated draw game data archived for long term storage is removed from the real-time system in its Final state 331.

Winning 327 tickets are another matter. Initially, after a drawing is concluded and the results are made official (i.e., the draw game state machine 300 advances to the Results 307 state), the ticket state machine 320 advances all winning tickets to the Winning state subclass of Unclaimed 328—i.e., Winner.Unclaimed 328'. This is the subclass 328 for all tickets from a closed drawing that have won a prize, but have not been redeemed. Of course, the data persists for these tickets in the system. From the Unclaimed 328 state, the ticket state machine 320 can progress to either Claimed 329 or Expired 330 subclass states. If the consumer redeems his or her ticket, that ticket changes to the Winner.Claimed subclass state 329'. Thus, in this state 329' the drawing has been concluded, the associated ticket has won a prize, and the prize has been paid. Naturally, the data associated with the ticket persists in both volatile 169 and non-volatile 165 memory until the time-period for redemption of the related drawing expires and the associated draw game data is archived for long term storage as it is removed from the real-time system in its Final state 331. In addition, redemption data is added to the ticket history in both volatile 169 and non-volatile 165 memory documenting facts (e.g., time, place) of the redemption. If a given ticket has won a prize, but was never redeemed during the draw game state machine's 300 Results state 307 (i.e., the period for winning redemptions for a given drawing has expired), the ticket will culminate in an Expired subclass state 330. The Winner.Expired subclass state 330' then documents that no prizes were paid for this particular ticket with the associated draw game data archived for long term storage and taken off the real-time system in its Final state 331.

Preferably, the volatile Data Storage 169 incorporates a key-value database system (e.g., REmote DIctionary Server or "Redis") thereby readily accommodating this added data. Key-value or Dictionary databases are a data storage paradigm designed for storing, retrieving, and managing associative arrays. Key-value databases contain a collection of objects, or records, which in turn have many different fields within them, each containing data. These records are stored and retrieved using a key that uniquely identifies the record (e.g., draw game ticket serial number), and is used to quickly find the data within the database. For example, if multiple bet numbers are stored, the numbers could be stored as a bitmap of a set number of bits e.g., the selection of balls "1,2,3,4,5,6" could be stored as 59-bits: "0,0,0, . . . , 0,0,1,1,1,1,1,1." In contrast, the non-volatile Bet Queue 163 and Ticket Storage 165 would preferably be maintained in a document database—e.g., as MongoDb®, Google BigTable™, or Apache Cassandra®.

Figure 4B:
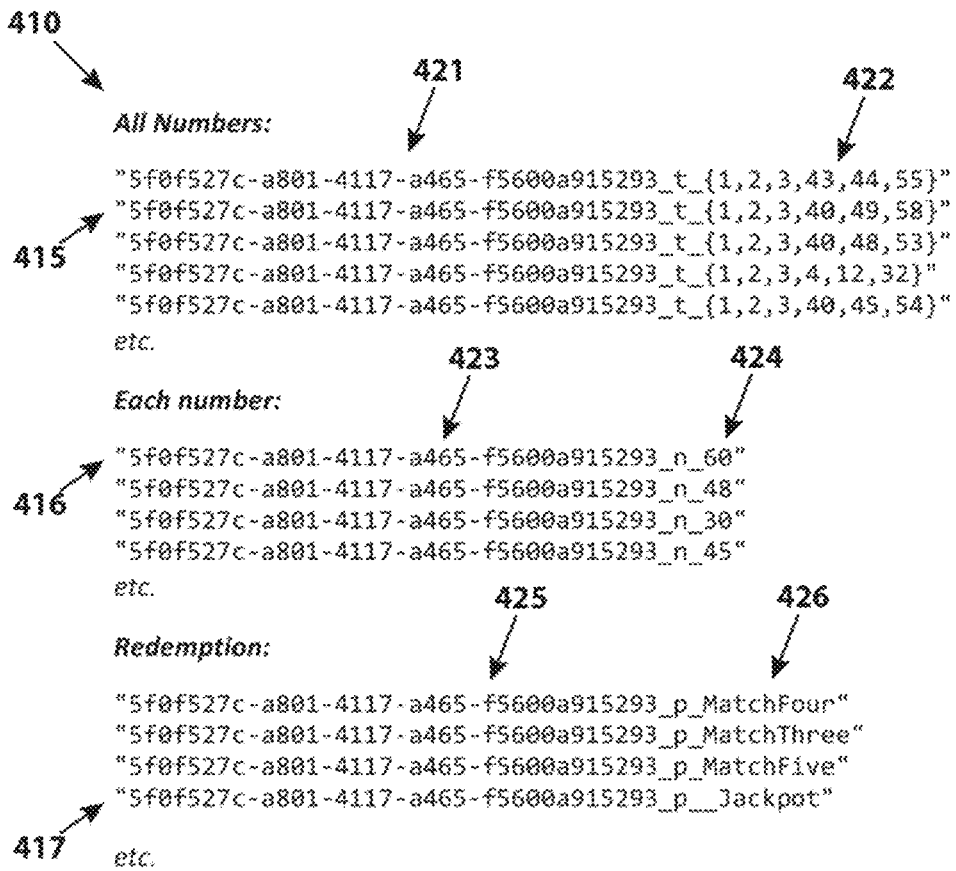
FIG. 4B is a representative example of the data sets that are stored and is compatible with the embodiment of FIG. 4A.

This key-value database system would typically be shared according to various functions applied to the unique draw game ticket serial number or "ticketid." A preferred key-value database storage architecture is illustrated in matrix 400 of FIG. 4A. Matrix 400 is arranged in four columns (i.e., Name 401, Description 402, Key 403, and Values 404) by three rows (i.e., All Numbers 405, Each Number 406, and Redemption 407) with each row describing the type of data. The overall matrix 400 therefore defines the specific arrangement of the wager data (408 and 406) to the Redemption data 407. The All Numbers 405 row of the matrix 400 provides a listing of the high-tier winning numbers or indicia for the associated drawing "drawid" and the specific ticketid with the key-value database structure of "<drawid>_t_<number>" via a GET function. The Each Number 406 row provides a listing of the wagered numbers or indicia for the associated drawing "drawid" and the specific ticketid with the key-value database structure of "<<drawid>_n_[1 . . . 59]>" via a SINTERSTORE function. Finally, the Redemption 407 row provides a listing of redeemed tickets for the associated drawing drawid and the specific ticketid with the key-value database structure of "<drawId>.redemption.<prizeLevel>." Examples of these three data sets 410 (i.e., All Numbers 415, Each Number 416, and Redemption 417) are provided in FIG. 4B. The All Numbers 415 key-value is shown to be a combination of the drawid 421 and high-tier winning numbers or indicia 422. The Each Number 416 key-value is illustrated as a combination of the drawid 423 and bet number or indicia 424. Finally, the Redemption 417 shows a combination of the drawid 425 and prize level 426 redeemed.

Ideally, three classes of data would be maintained in non-volatile memory. The preferred classes of data stored would be "Bet", containing the wager data, "Cancel", containing cancellation data, and "Redeem", containing redemption data. Part 1 of the Appendix is a simplified representative example of a code snippet 440 for executing data storage with the correct key-value. Each draw ticket would be stored with a partition key derived from the drawid and a modulus on the ticketid, which would be a generated 128-bit "UUID" (Universal Unique Identifier) consisting of the ticketid and the class of data stored, as well as an attribute consisting of textured data representing all the necessary data for the ticket itself.

One example modulus function would be to use the last bits in the ticketid to assign to 1, 2, 4, 8 . . . units—e.g.,
Ticketid: "641d8f94-0323-11e7-93ae-92361f002671"
Binary representation, e.g., " . . . 10111101"
Units (when using eight units): "101" (binary) or "5" (decimal)
A unique feature of this data storage arrangement is that the modulus function can be readily changed so long as legacy functions are stored against the draw which used them—thus readily enabling horizontal scaling of the system if real world data requirements exceed expectations.

The accepting and processing of wagers involves first loading a pending wager into the Bet Queue 163 (FIG. 1B), performing initial processing on the pending wager in the Bet Process 164, which stores the processed data in both volatile (169 and 169' of FIG. 1C) and non-volatile (165 of FIG. 1B and 165' of FIG. 1C) memory. Part 2 of the Appendix provides an exemplary code snippet 500 that reads pending wagers from the Bet Queue 163 (FIG. 1B) and ultimately stores the pending wager into both volatile (169 and 169' of FIG. 1C) and non-volatile (165 of FIG. 1B and 165' of FIG. 1C) memory. Part 3 of the Appendix provides an exemplary code snippet 525 that processes winning wagers stored in memory. Code snippet 525 provides part of the Draw service functionality.

Figure 5:
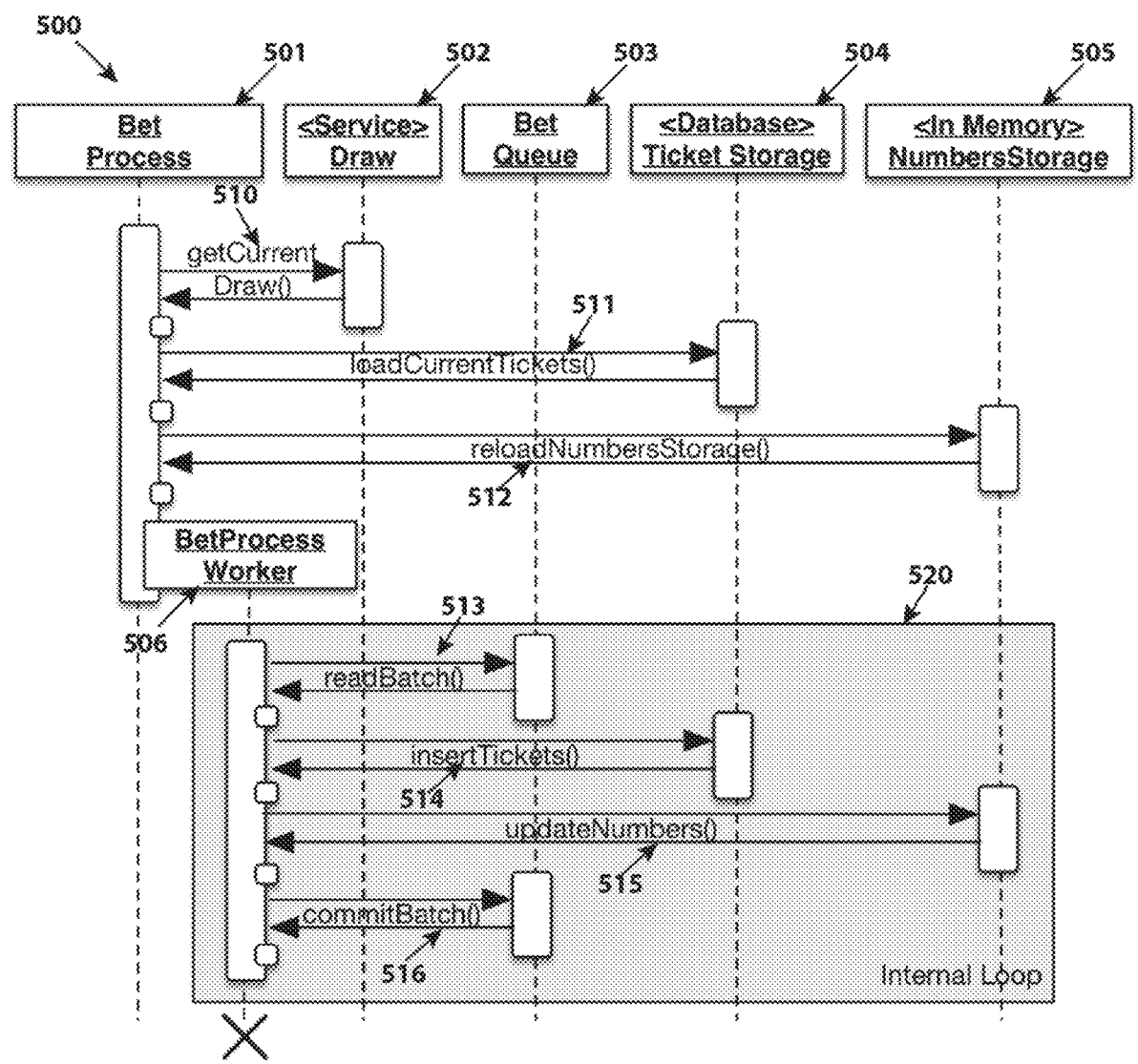
FIG. 5 is a sequence diagram, illustrating ticket queue functionality as an integral part of volatile memory data recovery that is compatible with the general embodiments of FIGS. 1A, 1B, and 1C.

The sequence diagram 500 of FIG. 5 illustrates how the non-volatile Bet Queue 503 (also 163 in FIG. 1B) is fundamental to allowing the draw game system's volatile memory (169 and 169' of FIG. 1C) to recover safely and swiftly from an outage while maintaining correct accounting. The sequence diagram 500 includes six objects—i.e., Bet Process 501, <Service> Draw 502, Bet Queue 603, <Database> Ticket Storage 604, <In Memory> Number Storage 605, and Bet Process Worker 506. The internal loop 520 that is an integral part of the Bet Process Worker 506 portions are highlighted as a gray rectangle in FIG. 5.

On system initialization after volatile memory was lost, the Bet Process 501 will first determine and acquire the current draw games pending 510 from the Draw 502 non-volatile memory via the "getCurrentDraw( )" synchronous interface. Immediately after the current draw game(s) have been determined, the Bet Processor 501 will message the Ticket Storage 504 non-volatile memory via "loadCurrentTickets( )" and load all tickets which exist in the current draw into volatile memory 511. Additionally, during this recover process the Bet Process 501 messages the Number Storage 505 through "reloadNumbersStorage( )" to also reload the volatile memory 512. However, depending on communication bandwidth, the recovery time to complete these tasks may be substantial—e.g., with commodity cloud infrastructure up to thirty minutes. Fortunately, new wagers can be accepted during this recovery period without any human perceivable delays with the new wagers being processed by the Bet Queue 503 and saved as a batch.

When the recovery is complete (i.e., Bet Process 501 ensures all data has been transferred to volatile memory and that the states of Number Storage and Ticket Storage match), the Bet Process Worker 506 process is started to transfer the real-time consumer wagers received during the recovery period into homogeneous volatile and non-volatile memory 520. The Bet Process Worker 506 accomplishes this task by first messaging the Bet Queue 503 with "readBatch( )" to relay all new wagers back 513. Next, the Bet Process Worker 506 messages Ticket Storage 504 via "insertTickets( )" to append the received new wagers into its volatile and non-volatile memory 514 followed by a similar messaging—i.e., "updateNumbers ( )"—with Number Storage 505 to append the new numbers 515. Upon completion of these tasks, the merged data becomes the restored volatile and non-volatile database 516 through "commitBatch( )".

While inherently flexible in design, the previous embodiments are mainly intended for "parimutuality" or lottery type draw games where: bets are placed on an outcome, the payout per winner is determined by the sum of all bets (less the house take), and the potential payout is known only approximately at the time the wager is made. True parimutuel (e.g., horse races, greyhound racing, jai alai, sporting events with ranked outcomes) as well as "Class II" Bingo draw game subsystems are similar in nature to the "parimutuality" overall system architecture with the mechanics for the acceptance, settlement, and redemption of bets as well as the recovery of volatile data in event of a system outage all remaining the same. However, with both true parimutuel and "Class II" Bingo games, the algorithms used to calculate prizes and gaming configuration are different. Therefore, the preprocessing required prior to storage in volatile memory, would also be different than for the previously disclosed "parimutuality" system.

With the specific embodiment of true parimutuel games, each bet may be a different size and each bet may involve a plurality of possible outcomes from the field (e.g., all the runners in a race). Additionally, with true parimutuel games there are typically multiplicities of possible bets (e.g., exacta, each way, trifecta), also referred to as "wager selections," each of which contributes to a pool and correspondingly prize fund to that specific bet type.

Therefore, with the specific embodiment of true parimutuel games, the algorithms used to calculate prizes and gaming configurations must also provide for:
1. Calculating the size of the pools—i.e., with true parimutuel games it is not possible to simply count the total number of bets. Instead, the system needs to maintain a running total of the sum of all bets placed in each pool memory. Referring to the high-level architecture of FIG. 1B, this is done by the Real Time Data service 170 and maintained in Data Storage 169.
2. Substantially varying each event, since the payoffs (and initial odds) will change with true parimutuel games depending on how the bet money is wagered. The Draw 167 and Draw Storage 168 components will therefore need to expose additional methods and data to retain the details of the bet options.
3. Allowing for a change in the betting field (wager field) via state and state transitions to handle changes in an event prior to start (e.g., a horse or player dropping out of a race or event before the start)—i.e., "Refunded" 627 (FIG. 6B).
4. Logging each bet (wager selection) with each of the results defined by the wager as well as logging with the associated wager pool—e.g., win, place, trifecta The data filed against the result is used to determine whether a ticket is a winner—the data filed against the pool is used to determine the size of a given pool.

Figure 6A:
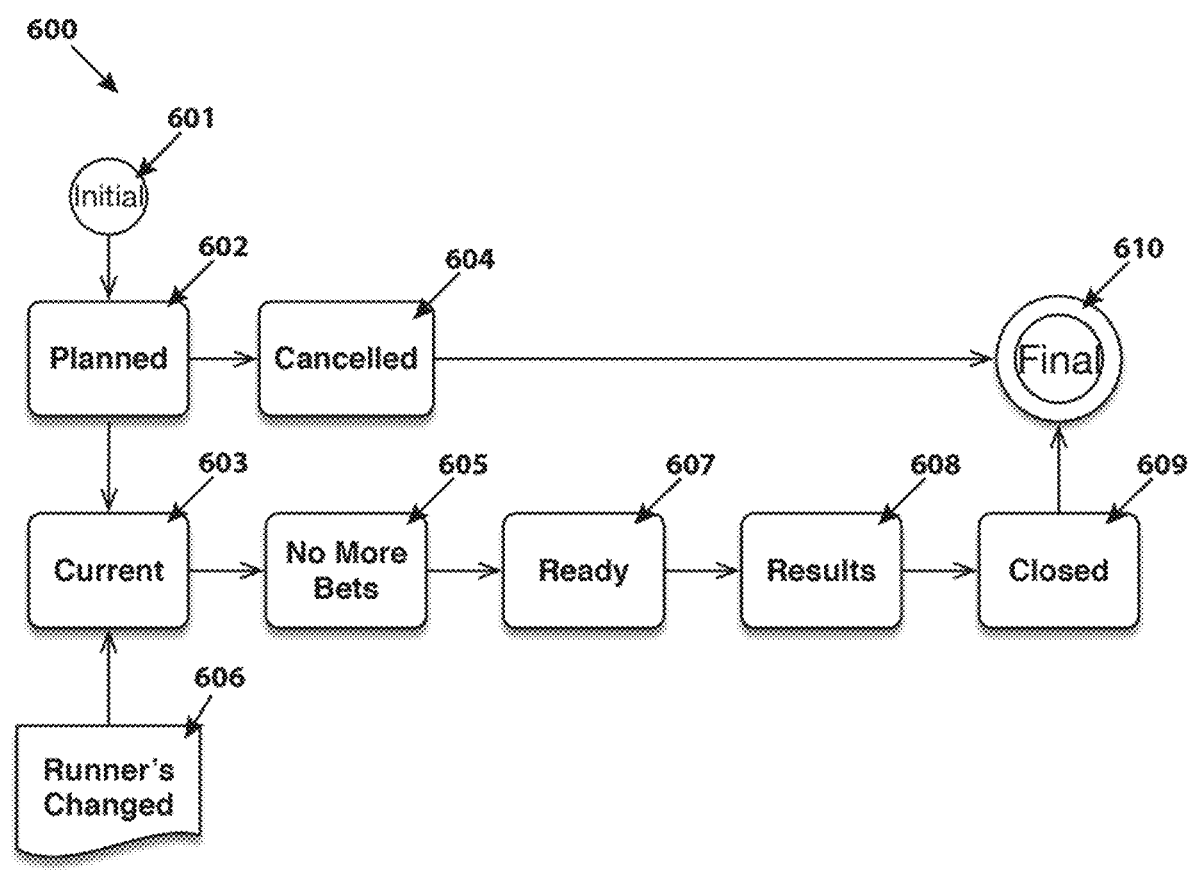
FIG. 6A is an overall logical state machine rendering representative example of the processes associated with operating a true parimutuel draw game compatible with the embodiments of FIGS. 1A, 1B, and 1C.
Figure 6B:
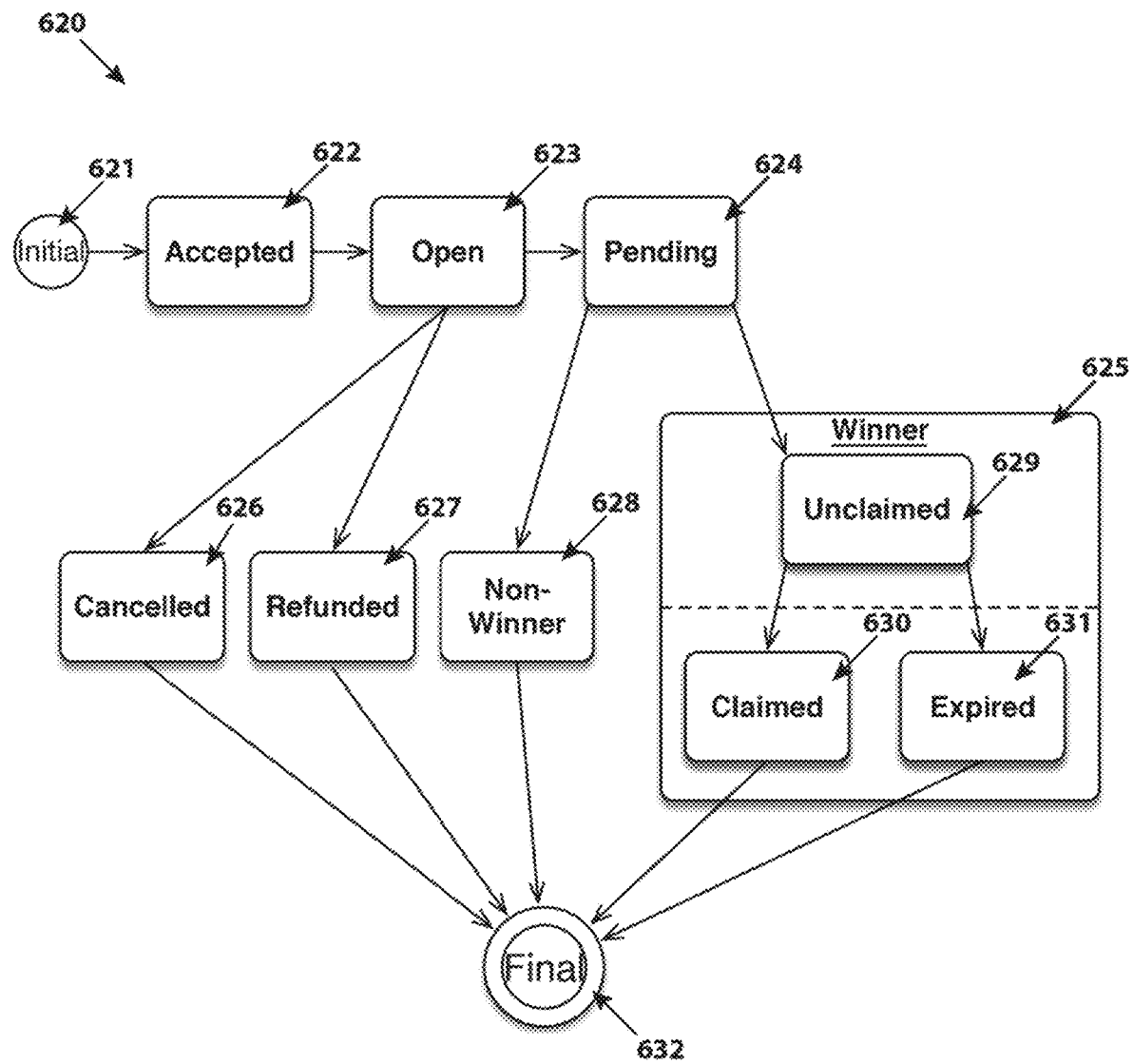
FIG. 6B is an overall logical state machine rendering representative example of the processes associated with issuing, canceling, and redeeming a true parimutuel draw game ticket compatible with the specific embodiment of FIGS. 1A, 1B, 1C, and 3A.

FIGS. 6A, 6B, and 6C, taken together, describe the various states for drawing and draw ticket systems compatible with true parimutuel games. FIG. 6A is an overall logical state machine 600 rendering representative example of the processes or states associated with the specific embodiment of true parimutuel games. FIG. 6B is an overall logical state machine 620 representative example of the processes associated with issuing, canceling, and redeeming a draw game ticket compatible with the specific embodiment 600 of FIG. 6A. Finally, FIG. 6C is a table 650 listing the unique in-memory data associated with the life cycle of a bet ticket compatible with the state machine embodiments 600 and 625 of FIGS. 6A and 6B.

The state machine example 600 of FIG. 6A graphically depicts the various logical states of an exemplary true parimutuel game progressing from initialization 601 through the final close out 610. From its Initial state 601, a typical true parimutuel draw game progresses to a Planned state 602 where the pending true parimutuel draw game is registered on the system along with programmed rules for the drawing (e.g., allow trifecta, exacta, multiple races), but not at this time accepting wagers. From this Planned state 602 the state machine can progress to one of two possible states. In some special circumstances a Cancelled state 604 (when for whatever reason the planned drawing or event is cancelled) would be adopted that removes associated data from the true parimutuel draw system, then progressing to the Final state 610. However, normally, the Planned state 602 progresses to the Current state 603, which effectively means that the true parimutuel drawing is available to accept bets or wagers. This Current state 603 will persist accepting wager sales until a predefined time (e.g., ten minutes) before the schedule drawing or event. However, under some special circumstances, a betting item from the field may be removed or changed 606—e.g., one horse is "scratched" from (drops out of) a race due to illness and is replaced by another horse). In this event 606, previous wagers may be refunded or recalculated in terms of payoff.

Assuming no changes 606 were made to the field or the changes 606 were made and all previous wagers reconciled, the state machine will progress to its No More Bets state 605, meaning that the Bet service 162 (FIG. 1B) will no longer allow a wager to be placed on the pending drawing. This state persists until the actual drawing (e.g., horse race, greyhound race, jai alai game, sporting event with ranked outcome) is conducted, at which point the state machine advances to its Ready state 607 (FIG. 6A) indicating that the draw game system (i.e., Draw service 167 and Draw Storage 168, both of FIG. 1B) has received and logged the drawing or event results, but the results are not yet certified (i.e., drawing or event results made official and publicly announced). Once the drawing results are certified, the state machine proceeds to its Results state 608 (FIG. 6A), thereby allowing the system to redeem winning tickets via its Check & Settle 166 service (FIG. 1B). After the period for redeeming tickets for a given drawing has expired, the state machine progresses to its Closed state 609 (FIG. 6A) where final accounting and archiving is performed for the existing drawing and all key metrics for wagers associated with the existing drawing are deleted from Data Storage 169 (FIG. 1B) high-speed volatile memory before the state machine concludes in its Final state 610 (FIG. 6A) for the existing drawing or event.

Running in parallel with state machine 600 while it maintains the various states associated with establishing a specific true parimutuel drawing, state machine 620 of FIG. 6B also provides the various logical states of a given draw or event from the perspective of issuing and redeeming a bet ticket, progressing from initialization 621 through the final close out 632. A key concept in the draw ticket state machine 620 architecture is that the state of a wager may not be simply referenced from one central database—i.e., it will be deduced from data stored in multiple locations. Thus, the draw ticket state machine 620 avoids updating records, as this is a relatively expensive operation (both in terms of computation and time) and has poor uniformity in modern databases. For example, when a draw game ticket is redeemed, the old record is not updated. Instead, a new record is created in the same non-volatile n storage unit.

The draw ticket state machine 620 advances from its Initial state 621 (where no draw game ticket processing occurs) to its Accepted state 622 when a new pending wager is placed. The Accepted state 622 occurs when a pending wager has been received by the Bet service 162 (FIG. 1B) with a unique serial number assigned to the pending wager waiting in the Bet Queue 163. The ticket state machine Accepted state 622 (FIG. 6B) occurs solely within the Current state 603 (FIG. 6A) of the overall true parimutuel draw game ticket process.

Once the pending wager progresses to the Bet Process service 164 (FIG. 1B) and is logged in both volatile 169 and non-volatile 165 memories, an acknowledgement is sent back to the Wager Interface 151 that initiated the wager request, a draw game ticket is typically printed, and the state of the draw ticket state machine 620 (FIG. 6B) progresses to its Open 623 state for the issued ticket. In this ticket Open state 623, all initial wager processing is completed with ticket data recorded on the system operating in the Current state 604 (FIG. 6A) of the draw game state machine 600.

From the Open state 623 (FIG. 6B) for a draw game ticket, there are three possible future states: Cancelled 626, Pending 624, or Refunded 627. As its name implies, the Cancelled state 626 exists to allow canceling of true parimutuel draw game tickets after the wager was logged, but before the No More Bets state 605 (FIG. 6A) time-period or state begins. If a cancellation is requested within the allowable time-period (i.e., before the true parimutuel drawing state machine 600 progresses to its No More Bets state 605), the draw ticket state machine 620 (FIG. 6B) will change the associated draw game ticket's data from the Open state 623 to the Cancelled state 626. This cancelled state allows extant persistent data of the draw game ticket to persist in volatile memory linked with the new Cancelled 626 data entry flagging that the associated draw game ticket has been canceled. This Canceled state 626 persists until the associated draw game's ticket redemption period has expired and progressed to its Final state 632, which is identical to the true parimutuel drawing state machine 600 (FIG. 6A) Final state 610.

For draw game tickets that were not cancelled, their data persists in the Open state 623 (FIG. 6B) until the No More Bets state 605 (FIG. 6A) is achieved on the draw game state machine 600. At this point, the draw ticket state machine 620 (FIG. 6B) changes all remaining ticket Open states 623 to Pending states 624 for all tickets associated with the drawing in the overall No More Bets 605 (FIG. 6A) state. This ticket Pending state 624 (FIG. 6B) continues so long as the No More Bets state 605 (FIG. 6A) persists in the true parimutuel game state machine 600 with the corresponding ticket data remaining in memory. Alternatively, in the special circumstances when an entry in the betting field (wager field) of a given ticket is withdrawn before the drawing or event occurs, the ticket becomes eligible for a refund—e.g., in a horse race a scheduled horse may become ill before the race and therefore "scratched" (i.e., removed from the race before the race starts). In this event, the ticket's state will be changed from Open 623 (FIG. 6B) to Refunded 627 when the ticket is presented to the system for a refund. Of course, the Refunded 627 state may be comprised of various sub-states to accommodate the local legal and jurisdictional requirements associated with processing refunds.

Once the drawing is completed and made official, the draw game state machine 600 (FIG. 6A) progresses to its Results state 608 with all tickets associated with the given drawing changing to either a Non-Winner 628 (FIG. 6B) or Winner 625 state. The Non-Winner state 628 is the state reserved for all tickets that did not win any prize after the drawing or event occurred and its results were made official. Thus, the Non-Winner state 628 is the state of all tickets that did not win a prize after a drawing was completed. All Non-Winner state 628 ticket data is maintained in both volatile 169 (FIG. 1B) and non-volatile 165 memories until the time-period for redemption of the related drawing expires and the associated draw game data archived for long term storage is removed from the real-time system in the Final state 632 (FIG. 6B).

Winning 625 tickets are another matter. Initially, after a drawing is concluded and the results are made official (i.e., the draw game state machine 600—FIG. 6A advances to the Results 608 state), the ticket state machine 620 (FIG. 6B) advances all winning tickets to the Winning state subclass of Unclaimed 629. This is the subclass 629 for all tickets from a closed drawing that have won a prize, but have not yet been redeemed. From the Unclaimed 629 state, the ticket state machine 620 can progress to either Claimed 630 or Expired 631 subclass states. If the consumer redeems his or her ticket, that ticket changes to the Claimed subclass state 630. Thus, in this state 630 the drawing has been concluded, the associated ticket has won a prize, and the prize has been paid. Naturally, the data associated with the ticket persists in both volatile 169 (FIG. 1B) and non-volatile 165 memories until the time-period for redemption of the related drawing expires and the associated draw game data is archived for long term storage and is removed from the real-time system in its Final state 631 (FIG. 6B). In addition, redemption data is added to the ticket history in both volatile 169 (FIG. 1B) and non-volatile 165 memories documenting logistical facts (e.g., time, place) of the redemption. If a given ticket has won a prize, but was never redeemed during the draw game state machine's 600 (FIG. 6A) Results state 608 (i.e., the period for winning redemptions for a given drawing has expired), the ticket will culminate in an Expired subclass state 631 (FIG. 6B). The Expired subclass state 631 then documents that no prizes were paid for this particular ticket with the associated draw game data archived for long term storage and taken off the real-time system in its Final state 632.

A graphic depiction of the unique in-memory data of the true parimutuel draw game ticket state machine 620 is illustrated in the table matrix 650 of FIG. 6C. In the matrix 650, the various types of in-memory data are listed in the Name 651 column with the associated Description 652, Key

653, and Values 654 descriptions located in the row associated with the given ticket in-memory data—e.g., all information associated with the Each Runner data is shown in row 655.

Each Runner 655 in-memory data is primarily utilized to determine the winning or non-winning status of each individual bet after the drawing or event has occurred. The corresponding Key 653 and Values 654 for Each Runner 655 in-memory data including the necessary information (e.g., "<drawId>_r_<runner_number>") so that any winning data can be readily identified. Of course, the Key 653 and Values 654 information listed for Each Runner 655 in-memory data is simply an example, the logic and data will vary depending on the nature of the pool. For example, assume the top three finishers in a race are "1, 2, and 3"; then a wager placed for the example race's key would vary depending on the wager type:

Winner: ticket_id in <drawId>_r_1
Place: ticket_id in <drawId>_r_1 OR <drawId>_r_2 OR <drawId>_r_3
Straight Forecast: ticket_id in <drawId>_r_1 AND <drawId>_r_2

Each Ticket 656 in-memory data is utilized to determine the winning the winning ticket for certain pools after the drawing or event has occurred. Depending on the draw game or event and the structure of the bet, the Each Ticket 656 in-memory data may not be required in some embodiments.

Each Pool Value 657 in-memory data is utilized to determine the value of the bet associated with the pool corresponding to the wager. Thus, Each Pool Value 657 in-memory data is essential to calculate the winnings for a given pool. The exemplary Key 653 and Values 654 for Each Pool Value 657 in-memory data assumes a single currency is utilized for all wagers. In the event that multiple currencies are allowed into a common betting pool, both the Key 653 and Values 654 for Each Pool Value 657 in-memory data would be expanded to identify the type of currency wagered.

Finally, Redemption 658 in-memory data is utilized to maintain the listing of bets that have been redeemed after the associated drawing or event has occurred. The Redemption 658 in-memory data is updated whenever the particular ticket is settled, thereby allowing the total liability to be calculated at that time in an ongoing basis. In various embodiments, the Key 653 data associated with Redemption 658 in-memory data would preferably be expanded to store the various channels or retailers where the wager was made to accommodate any local business requirements. On transition from Results 608 (FIG. 6A) to Closed 609 on the draw game state machine 600, the Redemption 658 (FIG. 6C) in-memory data will be moved to the Draw Storage 168 (FIG. 1B) database so that the volatile memory portion 169' (FIG. 1C) can be discarded.

With the specific embodiment of "Class II" Bingo draw games, unlike true parimutuel games, the wagers typically all have the same odds (i.e., any one Bingo card is not more likely to win than any other Bingo card) and the requirement for allowing for a change of the field prior to the drawing is not necessary. However, "Class II" Bingo draw games are nevertheless not directly compatible with "parimutuality" lottery type draw game systems, because:

1. The set of cards issued to consumers for a given drawing all vary and are typically fixed for that drawing.
2. In some versions of "Class II" Bingo there can be intermediate prizes awarded (e.g., one-line, two-line) before the drawing process is concluded.
3. The draw concludes only when someone has won the house or Bingo prize.
4. It may be required for a consumer to claim a line when the event occurs, otherwise they may forfeit the winning pattern on their card.

Thus, with the specific embodiment of "Class II" Bingo draw games, the algorithms used to calculate prizes and gaming configurations must also provide for:

1. Typically issuing a fixed set of cards for each drawing. Referring to the high-level architecture of FIG. 7A, this will be done by the Draw service 715 and maintained in Card Storage 714. Once issued to a consumer, the card's data will be maintained in Ticket Storage 712.
2. Maintaining in volatile Data Storage 717 and non-volatile Ticket Storage 712 separate matrixes of each number and its arrangement on each card.
3. Supporting a dynamic elongated drawing process where the end of the drawing process is indeterminate—i.e., Playing state 732 of FIG. 7B for the overall "Class II" Bingo state machine and a Playing state 752 (FIG. 7C) for the associated ticket state machine will both persist until a House or Bingo prize is awarded. This dynamic elongated drawing process will also require the Draw service 715 (FIG. 7A) to send draw numbers sequentially (i.e., one at a time) rather than in a batch.
4. Allowing for intermediate prize claims (e.g., lines) without concluding the drawing via a modified Check & Settle 713 service.
5. Processing winning claims in the order that they are submitted to avoid double claims (e.g., one consumer missed a line on their card, which was later claimed by a second consumer) via a modified Check & Settle 713 service.
6. Processing winning claims only when identified and presented by the consumer, not when a draw has produced a theoretical winner on a dispensed card.

Figure 7A:
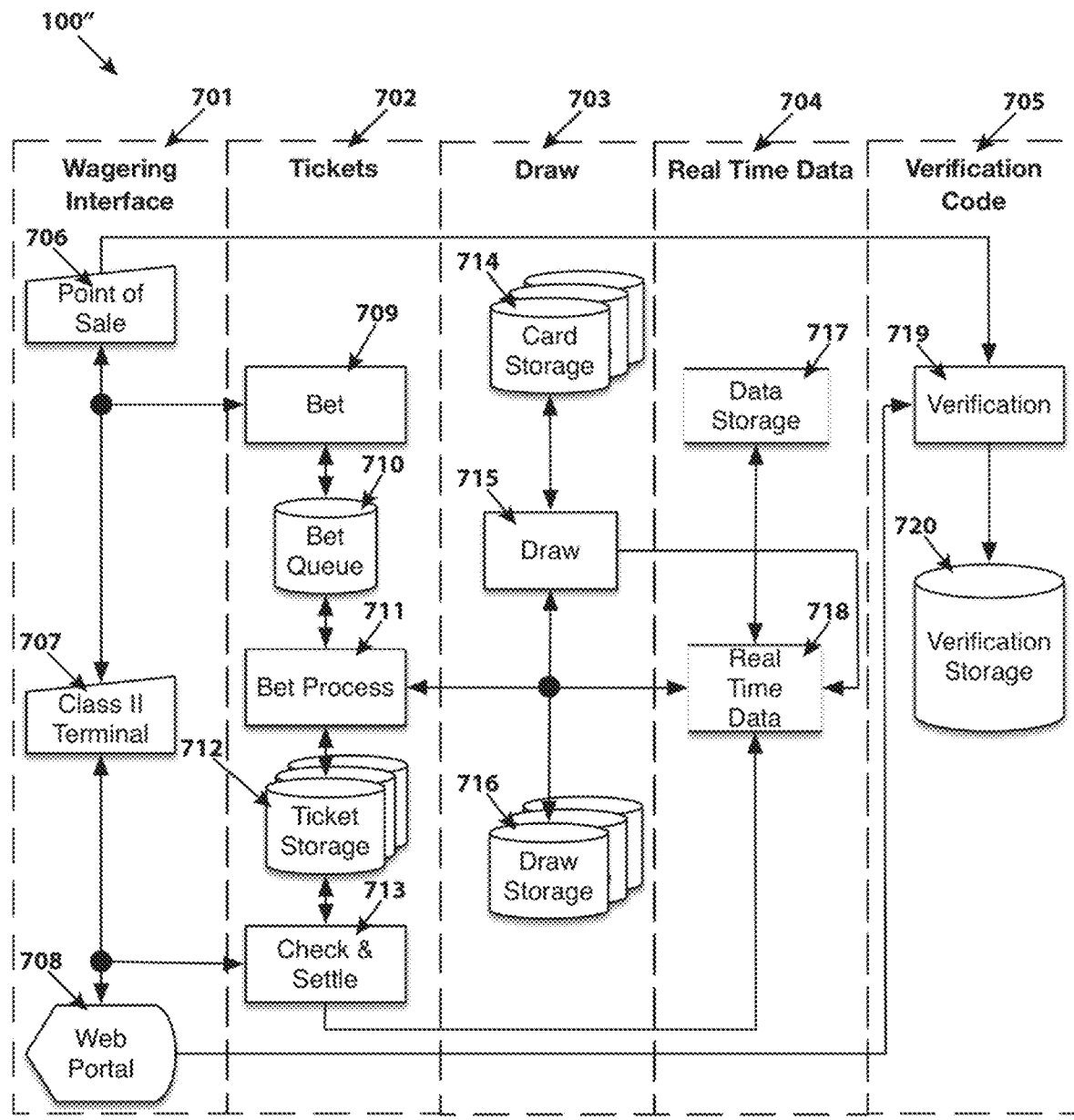
FIG. 7A is a representative example high level architecture swim lane diagram of the key components associated with processing and redeeming bets on the efficient draw game network system embodiment compatible with "Class II" Bingo draw games.
Figure 7B:
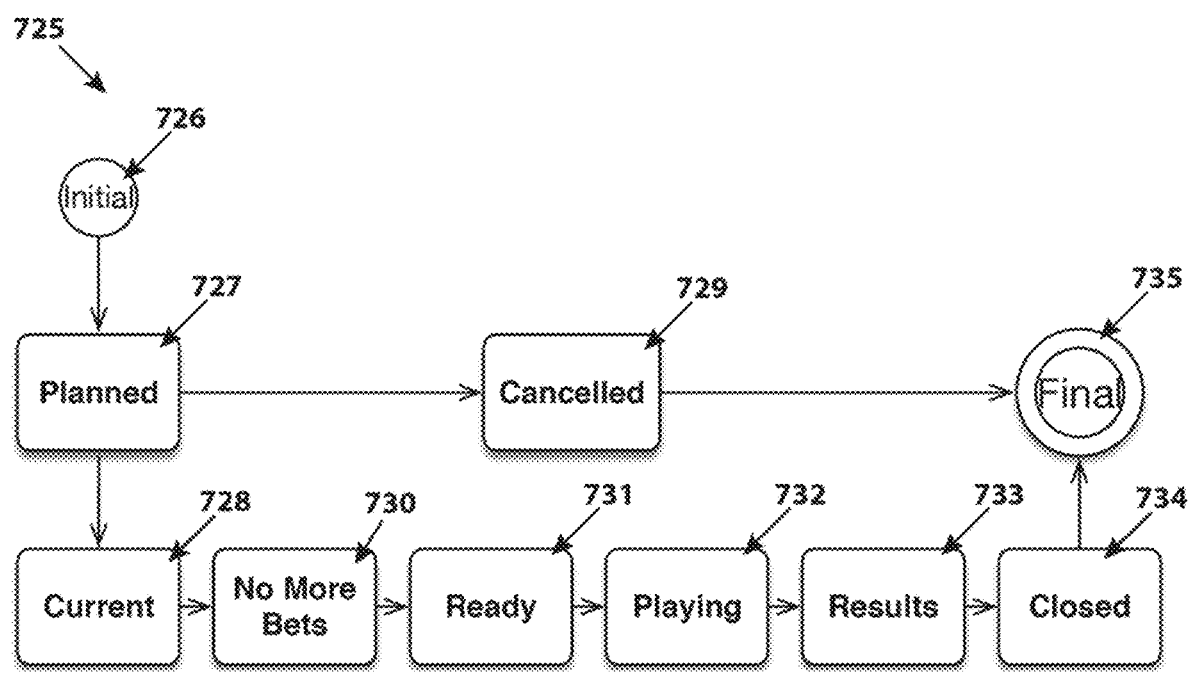
FIG. 7B is an overall logical state machine rendering representative example of the processes associated with operating a "Class II" Bingo draw game compatible with the embodiment of FIG. 7A.
Figure 7C:
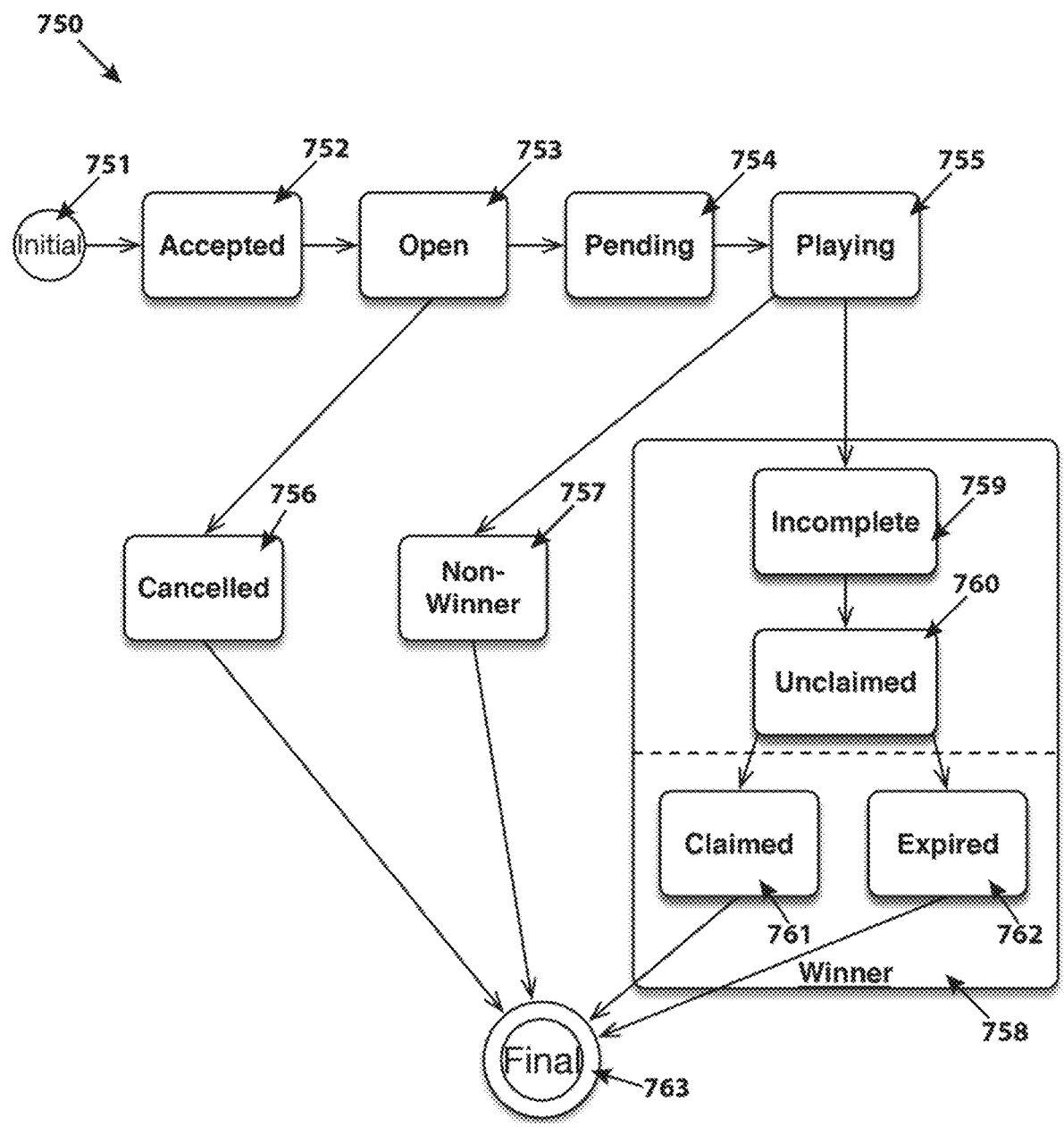
FIG. 7C is an overall logical state machine rendering representative example of the processes associated with issuing, canceling, and redeeming a "Class II" Bingo draw game ticket compatible with the specific embodiment of FIG. 7A.

FIGS. 7A, 7B, 7C, and 7D taken together, describe the various states for drawing and draw ticket systems compatible with "Class II" Bingo draw games. FIG. 7A depicts a swim lane flowchart providing a schematic graphical overview of the specific embodiment 100" of the present invention compatible with Class II" Bingo draw games. FIG. 7B is an overall logical state machine 725 rendering representative example of the processes or states associated with the specific embodiment of "Class II" Bingo draw games compatible with the specific embodiment 100" of FIG. 7A. FIG. 7C is an overall logical state machine 750 representative example of the processes associated with issuing, canceling, and redeeming a draw game ticket compatible with the specific embodiment 725 of FIG. 7B. Finally, FIG. 7D is a table 775 listing the unique in-memory data associated with the life cycle of a bet ticket compatible with embodiments 100", 725, and 750 of FIGS. 7A, 7B and 7C.

As shown in the swim lane diagram 100" of FIG. 7A, there are five functional components (i.e., Wagering Interface 701, Tickets 702, Draw 703, Real Time Data 704, and Verification Code 705) of the "Class II" Bingo specific invention, typically residing in separate physical or virtual computing devices. The Wagering Interface 701 (i.e., Point of Sale 706, "Class II" Terminal 707, and Web Portal 708) provides the transaction portal(s) that interact with specific consumers and/or operational staff, thereby enabling wagers or bets to be sold and Bingo cards to be issued. All wagers or bets received by the Wagering Interface 701 are passed to the Tickets component's 702 Bet service 709. After a given Bingo game drawing is closed with the house or Bingo winning card or ticket presented for redemption to the Wagering Interface 701, the potentially winning data is passed to the Check & Settle 713 service for validation and payment authorization. Optionally, the Wagering Interface 701 devices may also interface with the Verification Code 705 component's Verification 719 service for generating, storing 720, and validation ticket Macs.

Once a pending wager or bet is received by the Bet service 709 a unique serial number is assigned to the wager and the wager is passed to the Non-Volatile Bet Queue database 710, which effectively maintains the pending wager in a FIFO buffer while waiting for initial processing by the Bet Process service 711. When ready, the Bet Process service 711 receives the pending wager, acquires a unique Bingo card from the Draw 715 service, generates key metrics, and assigns the wager to one of n sets of non-volatile storage devices.

Once the Bet Process service 711 has completed the previously described pending services, it logs the wager in both high-speed volatile Data Storage memory 717 (i.e., as embodied by the key metrics) via the Real Time Data service 718, as well as lower-speed Non-Volatile Ticket Storage memory 712 (i.e., all raw bet data assigned to one of n sets), with the specific Bingo card saved in Non-Volatile Card Storage 714. After the wager is initially logged in the non-volatile Bet Queue 710, the Bet service 709 transmits an acknowledgement of the completed wager back to the wagering interface 701 device that initiated the wager request, ultimately culminating in a "payable on demand" ticket embodied as a Bingo card with a unique ticket serial number. After the Bet service 709 has completed its processing, it removes the ticket from the Bet Queue 710.

At some time before the actual drawing (e.g., one minute), the draw game system will no longer accept new wagers with the system assuming a No More Bets state 730 (FIG. 7B). After the No More Bets state 730 is actuated and all pending wagers are secured, an elongated drawing will occur to determine the (optional) lines and Bingo (house) winners. Once the drawing is completed and certified, the drawing results are logged into the Draw service 715 (FIG. 7A). The entered draw results are first saved in Non-Volatile Draw Storage 717 to enable the system to identify winners for the completed drawing. The Draw service 715 and associated non-volatile Draw Storage 716 record the given draw results with the associated time and date as well as various aggregate details (e.g., hash of all bet data for the drawing, size of the winning pool of tickets, number of total bets, payout per ticket, potential anomalies of the drawing) while typically (for reasons of efficiency) recording no individual information of the wager tickets or serial numbers issued.

When a winning ticket or serial number is presented to a Wagering Interface 701 device (i.e., Point of Sale 706, "Class II" Terminal 707, or Web Portal 708) for redemption, the Check & Settle service 713 receives the redemption request and queries the non-volatile Ticket Storage 712 to determine if the ticket or serial number presented is a valid winner and if it has not already been paid. Assuming the ticket or serial number is valid, the Check & Settle service 713 may optionally query the Draw service 715 to verify a ticket's winning status or the card configuration from the Card Storage service 714. Additionally, the Draw service 715 may check for any anomalies or updates, ultimately relaying the payment approval or rejection back to the Wagering Interface 701 device that initially made the request. Assuming the ticket is in fact a winner and has not already been paid, the Check & Settle service 713 relays a payment authorization back to the Wager Interface 701 device and writes the paid status to the non-volatile Ticket Storage 712 as well as the volatile Data Storage 717 memory.

The state machine example 725 of FIG. 7B graphically depicts the various logical states of an exemplary "Class II" Bingo draw game progressing from initialization 726 through the final close out 735. From its Initial state 726, a typical "Class II" Bingo draw game progresses to a Planned state 727 where the pending game is registered on the system along with programmed rules for the drawing (e.g., allow lines, maximum number of cards issued, minimum number of cards issued), but not at this time accepting wagers. From this Planned state 727 the state machine progresses to the Current state 728, which effectively means that the "Class II" Bingo draw game is available to accept bets or wagers and issue cards. This Current state 728 will persist accepting wager sales until a predefined time (e.g., one minute) before the schedule drawing.

The state machine 725 then progresses to its No More Bets state 730, meaning that the Bet service 709 (FIG. 7A) will no longer allow a wager to be placed on the pending drawing. This state persists until the actual drawing (i.e., sequentially revealing Bingo numbers) begins, at which point the state machine advances to its Ready state 731 (FIG. 7B) indicating that the "Class II" Bingo draw game system (i.e., Draw service 715 and Draw Storage 716, both of FIG. 7A) will begin sequentially revealing the draw game numbers at either a predetermined pace or an issue and wait mode where a human must signal the system when to release the next number. Once the first number is released, the state machine proceeds to its Playing state 732 (FIG. 7B), thereby allowing the system to redeem winning tickets via its Check & Settle 713 service (FIG. 7A). When a House or Bingo ticket is won and redeemed, the drawing process ends and the state machine progresses to its Results state 733 (FIG. 7B) where final accounting and archiving is performed for the existing drawing. Once the accounting and archiving is complete, the system advances to its Closed state 734 where all key metrics for wagers associated with the existing drawing are deleted from Data Storage 717 (FIG. 7A) high-speed volatile memory before the state machine concludes in its Final state 735 (FIG. 7B) for the existing drawing or event.

Running in parallel with state machine 725 while it maintains the various states associated with establishing a specific "Class II" Bingo draw game, state machine 750 of FIG. 7C also provides the various logical states of a given Bingo draw from the perspective of issuing and redeeming a bet ticket, progressing from initialization 751 through the final close out 763. A key concept in the draw ticket state machine 750 architecture is that the state of a wager may not be simply referenced from one central database—i.e., it will be deduced from data stored in multiple locations. Thus, the draw ticket state machine 750 avoids updating records, as this is a relatively expensive operation (both in terms of computation and time) and has poor uniformity in modern databases. For example, when a draw game ticket is redeemed, the old record is not updated. Instead, a new record is created in the same non-volatile n storage unit.

The draw ticket state machine 750 advances from its Initial state 751 (where no draw game ticket processing occurs) to its Accepted state 752 when a new pending wager is placed. The Accepted state 752 occurs when a pending wager has been received by the Bet service 709 (FIG. 7A) with a unique serial number and Bingo card assigned to the pending wager waiting in the Bet Queue 710. The ticket state machine 725 (FIG. 7C) Accepted state 752 occurs solely within the Current state 728 (FIG. 7B) of the overall "Class II" Bingo draw game ticket process.

Once the pending wager progresses to the Bet Process service 711 (FIG. 7A) and is logged in both volatile 717 and non-volatile 712 memories, an acknowledgement is sent back to the Wager Interface 701 that initiated the wager request, a combination draw game ticket and Bingo card is typically printed, and the state of the draw ticket state machine 750 (FIG. 7C) progresses to its Open 753 state for the issued ticket. In this ticket Open state 753, all initial wager processing is completed with ticket data recorded on the system operating in the Current state 728 (FIG. 7B) of the draw game state machine 725.

From the Open state 753 (FIG. 7C) for a Bingo draw game ticket, there are two possible future states: Cancelled 756 or Pending 754. As its name implies, the Cancelled state 756 exists to allow canceling of "Class II" Bingo draw game tickets after the wager was logged, but before the No More Bets state 730 (FIG. 7B) time-period or state begins. If a cancellation is requested within the allowable time-period (i.e., before the "Class II" Bingo draw game state machine 725 progresses to its No More Bets state 730), the draw ticket state machine 750 (FIG. 7C) will change the associated draw game ticket's data from the Open state 753 to the Cancelled state 756. This cancelled state allows extant persistent data of the draw game ticket to persist in volatile memory linked with the new Cancelled 756 data entry flagging that the associated draw game ticket has been canceled. This Canceled state 756 persists until the associated draw game's ticket redemption period has expired and progressed to its Final state 763.

For Bingo draw game tickets that were not cancelled, their data persists in the Open state 753 (FIG. 7C) until the No More Bets state 730 (FIG. 7B) is achieved on the draw game state machine 725. At this point, the draw ticket state machine 750 (FIG. 7C) changes all remaining ticket Open states 753 to Pending states 754 for all tickets associated with the drawing. This ticket Pending state 754 continues so long as the No More Bets 730 or Ready state 731 (FIG. 7B) persists in the "Class II" Bingo draw game state machine 725 with the corresponding ticket data remaining in memory.

Once the drawing commences the Bingo ticket state machine 750 (FIG. 7C) advances to its Playing state 755. Notice that the Winner state 758 includes an Incomplete 759 sub-state for "Class II" Bingo draw games. This Incomplete 759 sub-state may be entered for some tickets in the drawing while the majority of tickets remain in the Playing state 755. This special Incomplete 759 sub-state exists to accommodate the circumstances where a line has been won but the House or Bingo prize is still pending.

When the drawing is completed (i.e., a House or Bingo prize has been awarded), The remaining tickets advance from a Playing state 755 to either a Non-Winner 757 or Winner 758 state. The Non-Winner state 757 is the state reserved for all tickets that did not win any prize after the Bingo drawing occurred and its results were made official. Thus, the Non-Winner state 757 is the state of all tickets that did not win a prize after a drawing was completed.

Winning 758 tickets are another matter. Initially, after a drawing is concluded and the results are made official (i.e., the draw game state machine 725—FIG. 7B advances to the Results 733 state), the ticket state machine 750 (FIG. 7C) advances all winning tickets to the Winning state subclass of Unclaimed 760. This is the subclass 760 for all tickets from a closed drawing that have won a prize, but have not yet been redeemed. From the Unclaimed 760 state, the ticket state machine 750 can progress to either Claimed 761 or Expired 762 subclass states. If the consumer redeems his or her ticket, that ticket changes to the Claimed subclass state 761. Thus, in this state 761 the drawing has been concluded, the associated ticket has won a prize, and the prize has been paid. Naturally, the data associated with the ticket persists in both volatile 717 (FIG. 7A) and non-volatile 712 memories until the time-period for redemption of the related drawing expires and the associated draw game data is archived for long term storage and is removed from the real-time system in its Final state 763 (FIG. 7C). In addition, redemption data is added to the ticket history in both volatile 717 (FIG. 7A) and non-volatile 712 memories documenting logistical facts (e.g., time, place) of the redemption. If a given ticket has won a prize, but was never redeemed during the draw game state machine's 733 (FIG. 7B) Results state 733, the ticket will culminate in an Expired subclass state 762 (FIG. 7C). The Expired subclass state 762 then documents that no prizes were paid for this particular ticket with the associated draw game data archived for long term storage and taken off the real-time system in its Final state 763.

A graphic depiction of the unique in-memory data of the true parimutuel draw game ticket state machine 750 is illustrated in the table matrix 775 of FIG. 7D. In the matrix 775, the various types of in-memory data are listed in the Name 776 column with the associated Description 777, Key 778, and Values 779 descriptions located in the row associated with the given ticket in-memory data—e.g., all information associated with the Each Number data is shown in row 780.

Each Number 780 in-memory data is primarily utilized to locate the set of issued Bingo cards containing a given number. The Each Number 780 in-memory data enables very rapid first pass assessment of the plausibility of a winning ticket after each sequential draw number is revealed.

Each Card 781 in-memory data provides each Bingo card configuration (i.e., both numbers and arrangement). Similar to Each Number 780 in-memory data, Each Card 781 data allows for rapid validation of a claim on a prize.

Finally, Redemption 782 in-memory data maintains the listing of bets that have been redeemed while the associated drawing is occurring or after it is concluded. The Redemption 782 in-memory data is updated whenever the particular ticket is settled, thereby allowing the total liability to be calculated at that time in an ongoing basis.

Optionally, a preferred embodiment of the present invention is also capable of producing Macs for validation of draw game tickets (155 of FIG. 1B) presented for redemption. This validation service is intended to replace the serial number preprinted on the back of the ticket paper stock, thereby allowing cheaper (i.e., generic) thermal paper stock to be utilized. Additionally, this validation function provides a higher level of ticket authentication, for any ticket presented for payment (i.e., all prize tiers) as well as for wagers originating from consumer digital devices (e.g., iPhone®).

For security concerns, this validation service and associated data should be hosted at an independent physical location with separate personnel access than the rest of the system since the authentication data must be kept secret from all personnel with access to the rest of the system. The security goal is to increase the level of collusion necessary to an impractical level necessary to defraud the overall system. Thus, the validation system security is preferably designed with strict whitelists access.

The validation system will have a service which will accept three items of data:
1. The location or device that placed the wager
2. The drawid and the set of numbers selected
3. The time at which the wager was requested When this data is received, the validation system will perform a plausibility test on the time (e.g., was the wager received within one minute?) of the initiated request. Assuming this timing test passes, the validation system will then use a privately held randomly generated set of data with a suitable trapdoor function to create a response token or Mac which can later be used to prove that a ticket sale was correctly verified at the appropriate time by the verification subsystem.

Thus, the security features of the validation system will result in a failure of verification if any of the following is detected:
1. Modification of the bet selection
2. Creation of a ticket after the draw has been made
3. Creation of a ticket from a location not registered with the authentication system Part 4 of the Appendix is a simplified representative example of a code snippet 700 for executing ticket validation. In the actual software, it would be preferred to offer a different API (Application Programming Interface) to each entity accessing the validation module.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It should be appreciated by those skilled in the art in view of this description that various modifications and variations may be made present invention without departing from the scope and spirit of the present invention. It is intended that the present invention include such modifications and variations as come within the scope of the appended claims.

What is claimed is:

1. A method for storing a plurality of wager data from a plurality of individual wagers in a parimutuel game using (i) non-volatile data storage, and (ii) a volatile data storage device, wherein the wager data for each individual wager includes wager selection, wager amount, game identifier, wager field, and a unique wager identifier, the method comprising:
   (a) storing the wager data for each of the individual wagers in the non-volatile data storage;
   (b) after the wager data is stored in the non-volatile data storage, storing only a portion of the wager data for each of the individual wagers in the volatile data storage device, the stored portion of the wager data including at least (i) the wager selection, (ii) the wager field, and (iii) the unique wager identifier; and
   (c) performing a real time query of the wager data in the volatile data storage using a computing device, thereby providing for real time data mining of the wager data in the volatile data storage.

2. The method of claim 1 further comprising:
   (d) receiving and storing bets in a non-volatile data storage bet queue.

3. The method of claim 2 where the non-volatile data storage bet queue receives bets in real time from a wager interface.

4. The method of claim 2 wherein the pari-mutuel wagering system is used for playing parimutuel games, the method further comprising:
   (d) during a system outage for one of the parimutuel games, the non-volatile data storage bet queue receives saved bets from the non-volatile data storage to expedite reconstruction of the wager data in the volatile data storage device.

5. The method of claim 1 wherein the non-volatile data storage is n number of non-volatile data storage devices, the method further comprising prior to steps (a) and (b):
   (d) performing, in a computer processor, a mathematical operation on at least a portion of wager data for each of the individual wagers, the mathematical operation causing the plurality of wager data to be distributed among n sets, the wager data for each individual wager being distributed to one of the n sets,
   wherein the wager data for each of the individual wagers are stored in the nth non-volatile data storage device as distributed in step (a), and step (b) occurs after the wager data is stored in the n non-volatile data storage devices.

6. The method of claim 5 wherein the distribution is about even among the n sets, the wager data for each of the individual wagers thereby being about evenly distributed among the n numbers of non-volatile data storage devices.

7. The method of claim 5 wherein the mathematical operation is a modulus function.

8. The method of claim 1 further comprising:
   (d) generating, in a report processor, summary data of at least a portion of the wager data for each of the individual wagers, the summary data being a subset of the wager data and including at least (i) the wager selection, (ii) the wager field, and (iii) the unique wager identifier, wherein the wager data stored in the volatile data storage device is the summary data.

9. The method of claim 1 wherein the wagers are embodied by tickets, and the unique wager identifier is a unique ticket identifier.

10. The method of claim 1 wherein the game identifier includes a horse race track location, date, and race position in a queue.

11. The method of claim 1 wherein the wager selection includes selection of a winning horse or a trifecta.

12. The method of claim 1 wherein the wager field is a pool of horses that are running in particular race.

13. A system for storing a plurality of wager data from a plurality of individual wagers in a parimutuel wagering system, wherein the wager data for each individual wager includes wager selection, wager amount, game identifier, wager field, and a unique wager identifier, the system comprising:
   (a) non-volatile data storage that stores the wager data for each of the individual wagers;
   (b) a volatile data storage device that stores only a portion of the wager data for each of the individual wagers therein after the wager data is stored in the non-volatile data storage, the stored portion of the wager data including at least (i) the wager selection, (ii) wager field, and (iii) the unique wager identifier; and
   (c) a computing device configured to perform a real time query of the wager data in the volatile data storage, thereby providing for real time data mining of the wager data in the volatile data storage.

14. The system of claim 13 further comprising:
   (d) a non-volatile data storage bet queue that receives and stores bets.

15. The system of claim 14 where the non-volatile data storage bet queue receives bets in real time from a wager interface.

16. The system of claim 14 wherein the parimutuel wagering system is used for playing parimutuel games, and during a system outage for one of the parimutuel games, the non-volatile data storage bet queue receives saved bets from the non-volatile data storage to expedite reconstruction of the wager data in the volatile data storage device.

17. The system of claim 13 wherein the non-volatile data storage is n number of non-volatile data storage devices, the system further comprising:
(d) a computer processor configured to perform a mathematical operation on at least a portion of wager data for each of the individual wagers, the mathematical operation causing the plurality of wager data to be distributed among n sets, the wager data for each individual wager being distributed to one of the n sets, wherein the n number of non-volatile data storage devices store the wager data for each of the individual wagers in the nth non-volatile data storage device as distributed in accordance with the mathematical operation, and wherein the volatile data storage device stores the portion of the wager data for each of the individual wagers therein after the wager data is stored in the n non-volatile data storage devices.

18. The system of claim 17 wherein the distribution is about even among then sets, the wager data for each of the individual wagers thereby being about evenly distributed among the n numbers of non-volatile data storage devices.

19. The system of claim 17 wherein the mathematical operation is a modulus function.

20. The system of claim 13 further comprising:
(d) a report processor that generates summary data of at least a portion of the wager data for each of the individual wagers, the summary data being a subset of the wager data and including at least (i) the wager selection, (ii) the wager field, and (iii) the unique wager identifier, wherein the wager data stored in the volatile data storage device is the summary data.

21. The system of claim 13 wherein the wagers are embodied by tickets, and the unique wager identifier is a unique ticket identifier.

22. The system of claim 13 wherein the game identifier includes a horse race location, date, and race position in a queue.

23. The system of claim 13 wherein the wager selection includes selection of one or more winning horses or selection of a trifecta.

24. The system of claim 13 wherein the wager field is a pool of horses that are running is particular race.

* * * * *